(12) United States Patent
Isahaya et al.

(10) Patent No.: US 9,243,106 B2
(45) Date of Patent: *Jan. 26, 2016

(54) METHOD FOR CONTINUOUS PRODUCTION OF HIGH MOLECULAR WEIGHT POLYCARBONATE RESIN

(71) Applicant: MITSUBISHI GAS CHEMICAL COMPANY, INC., Tokyo (JP)

(72) Inventors: Yoshinori Isahaya, Ibaraki (JP); Atsushi Hirashima, Chiba (JP); Hidefumi Harada, Hyogo (JP); Maki Ito, Ibaraki (JP); Jun-ya Hayakawa, Chiba (JP); Takehiko Isobe, Chiba (JP); Taichi Tokutake, Tokyo (JP); Yousuke Shinkai, Chiba (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/400,640

(22) PCT Filed: May 14, 2013

(86) PCT No.: PCT/JP2013/063345
§ 371 (c)(1),
(2) Date: Nov. 12, 2014

(87) PCT Pub. No.: WO2013/172317
PCT Pub. Date: Nov. 21, 2013

(65) Prior Publication Data
US 2015/0133611 A1    May 14, 2015

(30) Foreign Application Priority Data

May 18, 2012 (JP) .................................. 2012-114936

(51) Int. Cl.
| | |
|---|---|
| *C08G 64/00* | (2006.01) |
| *C08G 64/30* | (2006.01) |
| *C08G 64/16* | (2006.01) |
| *C08G 64/06* | (2006.01) |
| *C08G 63/02* | (2006.01) |

(52) U.S. Cl.
CPC .............. *C08G 64/307* (2013.01); *C08G 64/06* (2013.01); *C08G 64/1608* (2013.01); *C08G 64/30* (2013.01); *C08G 64/305* (2013.01)

(58) Field of Classification Search
CPC . C08G 64/307; C08G 64/403; C08G 64/1616
USPC ...................... 264/141, 211.24; 528/196, 198
See application file for complete search history.

(56) References Cited

U.S. PATENT DOCUMENTS

| | | |
|---|---|---|
| 3,535,280 A | 10/1970 | Schnell et al. |
| 5,521,275 A | 5/1996 | McCloskey et al. |
| 5,696,222 A | 12/1997 | Kaneko et al. |
| 6,300,459 B1 | 10/2001 | Kaneko et al. |
| 7,132,498 B2 | 11/2006 | McCloskey et al. |
| 8,445,624 B2 | 5/2013 | Fuji et al. |
| 2013/0131271 A1* | 5/2013 | Yokogi et al. ................. 525/185 |
| 2013/0197166 A1* | 8/2013 | Isahaya et al. ................. 525/462 |
| 2013/0317182 A1 | 11/2013 | Isahaya et al. |
| 2014/0371404 A1 | 12/2014 | Isahaya et al. |

FOREIGN PATENT DOCUMENTS

| | | |
|---|---|---|
| EP | 0 595 608 | 5/1994 |
| EP | 1 363 962 | 11/2003 |
| EP | 2 354 175 | 8/2011 |
| JP | 50-19600 | 7/1975 |
| JP | 2-153923 | 6/1990 |
| JP | 6-94501 | 11/1994 |
| JP | 7-26009 | 1/1995 |
| JP | 3317555 | 6/2002 |
| JP | 4112979 | 4/2008 |
| JP | 2008-514754 | 5/2008 |
| JP | 4286914 | 4/2009 |
| JP | 2009-102536 | 5/2009 |
| JP | 2009-161745 | 7/2009 |
| JP | 2010-150540 | 7/2010 |
| JP | 2011-6553 | 1/2011 |
| WO | 2011/062220 | 5/2011 |
| WO | 2012/005251 | 1/2012 |
| WO | 2012/108510 | 8/2012 |
| WO | 2013/100072 | 7/2013 |

OTHER PUBLICATIONS

Search report from PCT/JP2013/063345, mail date is Aug. 20, 2013.

* cited by examiner

*Primary Examiner* — Terressa Boykin
(74) *Attorney, Agent, or Firm* — Greenblum & Bernstein, P.L.C.

(57) ABSTRACT

A high molecular weight polycarbonate resin is continuously produced by subjecting an aromatic polycarbonate prepolymer and an aliphatic diol compound to a linking and highly polymerizing reaction. Even an aliphatic diol compound having a comparatively low boiling point can be allowed to efficiently contribute to the linking and highly polymerizing reaction. An aromatic polycarbonate prepolymer is produced by a polycondensation reaction between an aromatic dihydroxy compound and a diester carbonate, adding an aliphatic diol compound having an aliphatic group bonding to a terminal hydroxyl group to obtain a prepolymer mixture, and subjecting the resulting prepolymer mixture to a linking and highly polymerizing reaction under reduced pressure. The aliphatic diol compound is added at a pressure exceeding 200 torr, and the prepolymer mixture is subjected to a linking and highly polymerizing reaction before the terminal hydroxyl group concentration of the aromatic polycarbonate prepolymer in the prepolymer mixture reaches 2000 ppm.

13 Claims, 1 Drawing Sheet

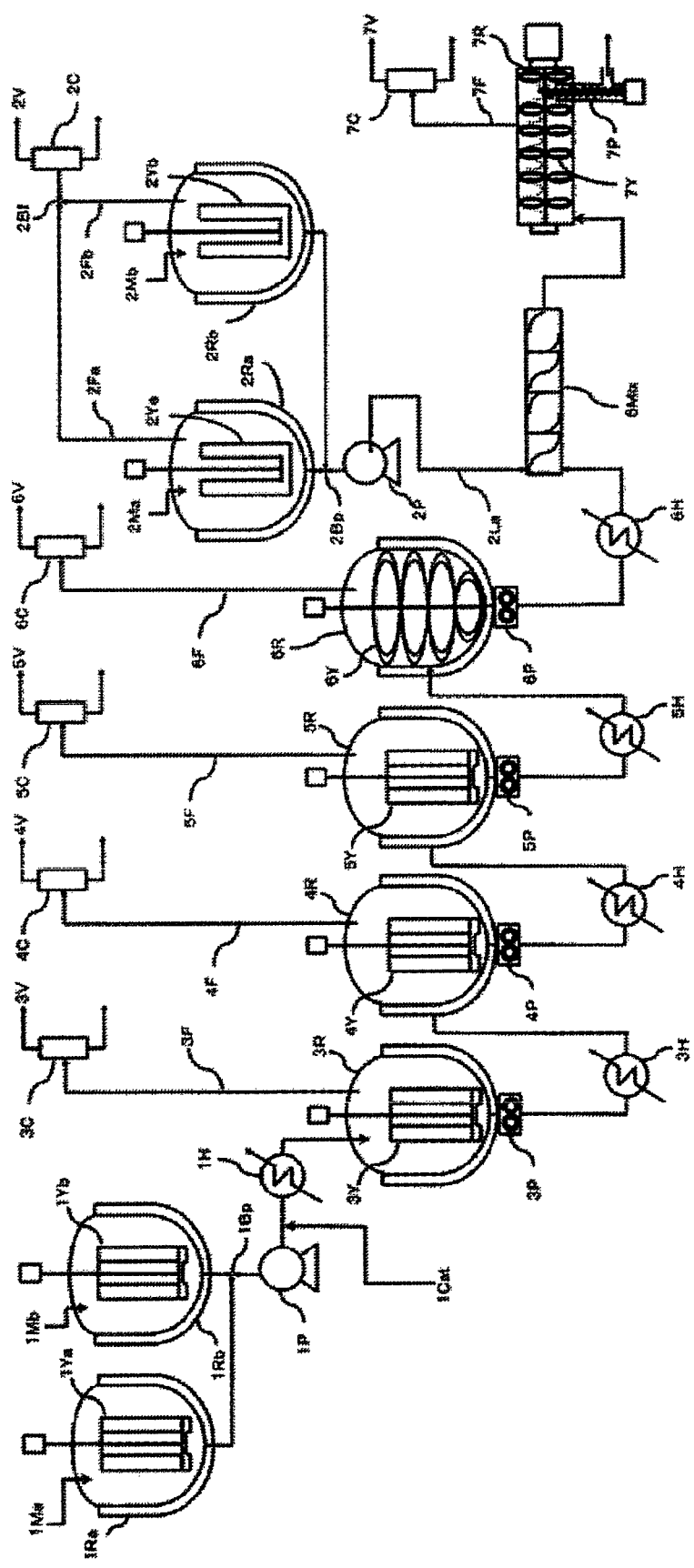

METHOD FOR CONTINUOUS PRODUCTION OF HIGH MOLECULAR WEIGHT POLYCARBONATE RESIN

TECHNICAL FIELD

The present invention relates to a method for continuously producing a high molecular weight polycarbonate resin comprising a step for subjecting an aromatic polycarbonate prepolymer and an aliphatic diol compound to a linking and highly polymerizing reaction.

BACKGROUND ART

Polycarbonates have recently come to be widely used in numerous fields due to their superior heat resistance, impact resistance and transparency. Numerous studies have previously been conducted on methods for producing these polycarbonates. Among these, polycarbonates derived from 2,2-bis(4-hydroxyphenyl)propane (to be referred to as "bisphenol A"), for example, have been industrialized by both interfacial polymerization and melt polymerization production methods.

According to this interfacial polymerization, polycarbonate is produced from bisphenol A and phosgene, but it requires the use of toxic phosgene. In addition, this method also has problems such as corrosion of equipment by chlorine-containing compounds such by-product hydrogen chloride and sodium chloride as well as methylene chloride used in large amounts as a solvent, and difficulty in removing impurities such as sodium chloride as well as residual methylene chloride that have an effect on polymer properties.

On the other hand, melt polymerization, consisting of polymerizing, for example, bisphenol A and diphenyl carbonate in a molten state by a transesterification reaction while removing by-product aromatic monohydroxy compounds (phenol in the case of reacting bisphenol A and diphenyl carbonate) has long been known as a method for producing polycarbonates from aromatic dihydroxy compounds and diaryl carbonates.

Differing from interfacial polymerization, melt polymerization offers advantages such as not using a solvent, but it also has the intrinsic problem of polymer viscosity in the system increasing rapidly as polymerization progresses, thereby making it difficult to efficiently remove by-product aromatic monohydroxy compounds outside the system while also making it difficult to increase the degree of polymerization due to an extreme decrease in the reaction rate. Accordingly, an effective method is sought for producing high molecular weight aromatic polycarbonate resin using melt polymerization.

Various contrivances have been proposed for extracting aromatic monohydroxy compounds from highly viscous polymers for use as methods that solve the aforementioned problems (Patent Document 1: Japanese Examined Patent Publication No. S50-19600, Patent Document 2: Japanese Unexamined Patent Publication No. H2-153923, and Patent Document 3: U.S. Pat. No. 5,521,275).

However, in the methods disclosed in these publications, it is not possible to adequately increase the molecular weight of the resulting polycarbonate. When highly polymerization is conducted by a method that uses a large amount of catalyst (Patent Document 2, Patent Document 3) or under severe conditions in the manner of applying high shear (Patent Document 1) as previously described, there are considerable detrimental effects on the physical properties of the resin, such as inferior resin hue or the progression of crosslinking reactions.

In addition, methods have also been proposed for enhancing the degree of polymerization of polycarbonates by adding a polymerization promoter or linking agent and the like to the reaction system during melt polymerization (Patent Documents 4 to 10). In addition, although the objective is not necessarily the same, methods consisting of the addition of a diol compound to a reaction system between a dihydroxy compound and diester carbonate have previously been proposed (Patent Documents 11 and 12).

However, these methods also have problems such as failure to inadequately increase the degree of polymerization or causing decreases in the inherent physical properties of the resulting polycarbonate resin (such as thermal stability, impact resistance or hue).

In this manner, since conventional methods for producing high molecular weight aromatic polycarbonates have numerous problems, there is a strong desire for the development of a production method capable of retaining the inherent favorable qualities of polycarbonates while achieving an adequate highly polymerization.

The inventors of the present invention previously proposed a method for producing a high molecular weight aromatic polycarbonate resin capable of retaining the favorable qualities of aromatic polycarbonate resins while adequately highly polymerizing (Patent Document 13). This method consisted of highly polymerizing by linking an aromatic polycarbonate prepolymer having an extremely low terminal hydroxyl group concentration with a linking agent composed of an aliphatic diol compound, which has a specific structure and has an aliphatic group that bonds to a terminal hydroxyl group contributing to the formation of a carbonate bond by transesterification (to simply be referred to as an "aliphatic diol compound"), by copolymerizing in the presence of a transesterification catalyst under a reduced pressure condition, thereby making it possible to obtain an adequately highly polymerized polycarbonate resin provided with the inherent physical properties of aromatic polycarbonate resins. The following indicates an example of the specific reaction scheme of this linking and highly polymerizing reaction using an aliphatic diol compound.

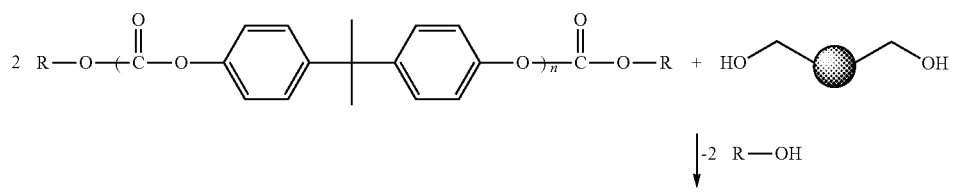

-continued

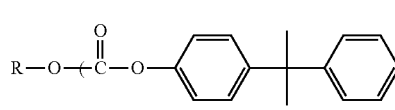
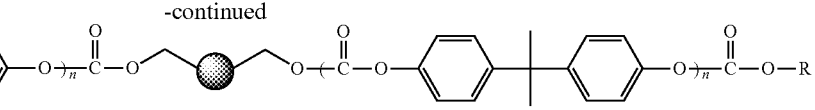

On the other hand, the step for subjecting an aromatic polycarbonate prepolymer and an aliphatic diol compound to a linking and highly polymerizing reaction can also be said to be a step for producing a copolymer of the aromatic polycarbonate prepolymer and the aliphatic diol compound. In general, in the case of obtaining a copolymer by continuously copolymerizing copolymerization components with each other, all of the materials (copolymerization components or reaction components) are normally preliminarily adequately mixed over a comparatively long period of time at normal pressure with a mixer, followed by transferring to a reaction vessel and copolymerizing. In a transesterification reaction during ordinary production of aromatic polycarbonate resins in particular, although a large, horizontal stirred reaction vessel having a large reaction surface area is preferably used to enhance devolatilization effects on by-product phenol and accelerate the reaction, since the stirring capacity of the horizontal stirred reaction vessels is not large, reaction components are typically introduced into the horizontal stirred reaction vessel after having been adequately mixed in advance.

Continuous multistage polymerization methods are also known in the prior art that consist of arranging a plurality of polymerization tanks in series in production of an aromatic polycarbonate resin (Patent Documents 14 to 16).

PRIOR ART DOCUMENTS

Patent Documents

Patent Document 1: Japanese Examined Patent Publication No. S50-19600
Patent Document 2: Japanese Unexamined Patent Publication No. H2-153923
Patent Document 3: U.S. Pat. No. 5,521,275
Patent Document 4: European Patent No. 0595608
Patent Document 5: U.S. Pat. No. 5,696,222
Patent Document 6: Japanese Patent No. 4112979
Patent Document 7: Japanese Unexamined Patent Application Publication (Translation of PCT Application) No. 2008-514754
Patent Document 8: Japanese Patent No. 4286914
Patent Document 9: Japanese Examined Patent Publication No. H6-94501
Patent Document 10: Japanese Unexamined Patent Publication No. 2009-102536
Patent Document 11: Japanese Patent No. 3317555
Patent Document 12: Japanese Unexamined Patent Publication No. H7-26009
Patent Document 13: International Publication No. WO 2011/062220
Patent Document 14: Japanese Unexamined Patent Publication No. 2009-161745
Patent Document 15: Japanese Unexamined Patent Publication No. 2010-150540
Patent Document 16: Japanese Unexamined Patent Publication No. 2011-006553

DISCLOSURE OF THE INVENTION

Problems to be Solved by the Invention

However, in the case of highly polymerizing by linking an aromatic polycarbonate prepolymer and a specific aliphatic diol compound as previously described, since the reaction rate of the prepolymer and the aliphatic diol compound is extremely high and the linking reaction proceeds extremely rapidly, the linking reaction proceeds rapidly immediately after contact between the aromatic polycarbonate prepolymer and the aliphatic diol compound (namely, immediately after mixing the two), and prepolymers end up linking, thereby highly polymerizing while also forming by-products such as phenol.

In the case of continuously producing the aforementioned high molecular weight polycarbonate resin on a large scale, if components are stirred and mixed at normal pressure in a mixer as in the prior art, a cleavage (fragmentation) reaction of the prepolymer main chain conversely proceeds due to by-products formed during that time, thereby causing a decrease in molecular weight.

In the case of producing on a comparatively small scale in batches and the like, there are cases in which the product (high molecular weight polycarbonate resin) can be recovered without the cleavage (fragmentation) reaction of the prepolymer main chain proceeding significantly due to the short dissolving and stirring times. Typically in the case of a continuous production method carried out industrially on a large scale, however, transesterification occurs during the time of mixing in the mixer as well, and as a result thereof, while the linking reaction proceeds, the cleavage (fragmentation) reaction of the prepolymer main chain also proceeds due to the presence of by-products formed.

Once the cleavage (fragmentation) reaction of the prepolymer main chain has proceeded, aromatic polycarbonate prepolymers must be reacted with each other in order to increase molecular weight, and the reaction requires a long period of time. As a result, in order to achieve an adequate highly polymerizing, it becomes necessary to allow the reaction mixture to remain in the reaction vessel for linking and highly polymerizing for a long period of time. As the amount of time the reaction mixture remains in the reaction vessel becomes longer, there is a tendency for the quality of the resulting high molecular weight polycarbonate resin to decrease in the manner of an increase in the degree of branching (an increase in N value to be subsequently defined that is an indicator of structural viscosity), intensified coloring resulting in poor color tone, and an increase in structural heterogeneity.

In addition, in the continuous multistage polymerization method consisting of arranging a plurality of polymerization tanks in series to produce an aromatic polycarbonate as disclosed in the aforementioned Patent Documents 14 to 16, proposals have not been found for devising contrivances for employing continuous multistage polymerization in a production step of a polycarbonate resin for increasing molecular weight by linking an aromatic polycarbonate prepolymer and an aliphatic diol compound, and shortening retention time of the reaction mixture in a reaction vessel for continuously increasing molecular weight using a linking reaction by inhibiting progression of the cleavage (fragmentation) reaction caused by by-products.

With the foregoing in view, the inventors of the present invention previously proposed a method for increasing the rate of phenol devolatilization by continuously supplying an aliphatic diol compound under reduced pressure as a contrivance for shortening retention time in a linking and highly polymerizing reaction vessel by inhibiting progression of a cleavage (fragmentation) reaction in a step for subjecting an aromatic polycarbonate prepolymer and an aliphatic diol compound having a specific structure to a linking and highly polymerizing reaction (Japanese Patent Application No. 2011-287048 and PCT/JP2012/0839924). Furthermore, the contents described in Japanese Patent Application No. 2011-287048 and PCT/JP2012/0839924 are incorporated herein by reference.

Although the aforementioned method proposed by the inventors of the present invention is a more suitable method in the case of using an aliphatic diol compound having a comparatively high boiling point for the aforementioned aliphatic diol compound having a specific structure, aliphatic diol compounds having a comparatively high boiling point may not always be satisfactory in terms of price and stable supply.

On the other hand, among the aforementioned aliphatic diol compounds having a specific structure, aliphatic diol compounds having a comparatively low boiling point, which can be expected to less expensive and available in stable supply, tend to have slightly higher volatility than aliphatic diol compounds having a comparatively high boiling point. Therefore, in the case of a method in which the aliphatic diol compound is supplied continuously under reduced pressure, a considerable amount of the aliphatic diol compound may volatilize during mixing with the prepolymer, thereby resulting in the possibility of causing a decrease in the addition rate (immobilization rate) and resulting in only a portion of the aliphatic diol compound being able to contribute to the copolymerization reaction. Thus, accommodations are required to be made in the same manner as conventional methods by preliminarily supplying an excess of the aliphatic diol compound or providing a step for recycling the aliphatic diol compound, which cannot necessarily be said to be economically advantageous in the case of continuously producing high molecular weight polycarbonate resin industrially on a large scale.

Accordingly, the development of a method is sought that is also suitable for aliphatic diol compounds having a comparatively low boiling point in consideration of the case of using an aliphatic diol compound having a comparatively low boiling point that can be expected to be less expensive and available in stable supply.

An object of the present invention is to provide an improved method for continuously producing a high molecular weight polycarbonate resin comprising a step for subjecting an aromatic polycarbonate prepolymer and an aliphatic diol compound to a linking and highly polymerizing reaction, which is able to efficiently contribute to the linking and highly polymerizing reaction even when using an aliphatic diol compound having a comparatively low boiling point, and allows a high molecular weight polycarbonate having superior quality to be produced both economically and advantageously.

Means for Solving the Problems

As a result of conducting extensive studies to solve the aforementioned problems, the inventors of the present invention found that, in a step for subjecting an aromatic polycarbonate prepolymer and an aliphatic diol compound to a linking and highly polymerizing reaction, the aforementioned problems can be solved by continuously supplying the aliphatic diol compound under extremely limited conditions, thereby leading to completion of the present invention.

Namely, the present invention relates to a method for continuously producing a high molecular weight polycarbonate resin as indicated below. More specifically, the present invention relates to a continuous production method for obtaining a high molecular weight polycarbonate resin having superior performance by, in a continuous method comprising a step for producing an aromatic polycarbonate prepolymer, and a step for linking the resulting aromatic polycarbonate prepolymer with a linking agent composed of an aliphatic diol compound to highly polymerize, rapidly carrying out the linking and highly polymerizing reaction between the prepolymer and the linking agent at that time.

(1) A method for continuously producing a high molecular weight polycarbonate resin, comprising:

a step (A) for producing an aromatic polycarbonate prepolymer by a polycondensation reaction between an aromatic dihydroxy compound and a diester carbonate, a step (B) for adding an aliphatic diol compound having an aliphatic group that bonds to a terminal hydroxyl group to the aromatic polycarbonate prepolymer obtained in step (A) to obtain a prepolymer mixture, and a step (C) for subjecting the prepolymer mixture obtained in step (B) to a linking and highly polymerizing reaction under a reduced pressure condition; wherein, in step (B), the aliphatic diol compound is added to the aromatic polycarbonate prepolymer obtained in step (A) at a pressure exceeding 200 torr to obtain the prepolymer mixture, and then, the prepolymer mixture is subjected to a linking and highly polymerizing reaction under a reduced pressure condition in step (C) before the terminal hydroxyl group concentration of the aromatic polycarbonate prepolymer in the prepolymer mixture reaches 2000 ppm.

(2) The continuous production method according to (1), wherein the prepolymer mixture is subjected to the linking and highly polymerizing reaction in step (C) within 7 minutes from the start of addition of the aliphatic diol compound.

(3) The continuous production method according to (1) or (2), wherein the aliphatic diol compound is a compound represented by the following general formula (A):

$$HO—(CR_1R_2)_n-Q-(CR_3R_4)_m—OH \quad (A)$$

wherein, Q represents a hydrocarbon group having 3 or more carbon atoms that may contain a heteroatom, $R_1$, $R_2$, $R_3$ and $R_4$ respectively and independently represent a group selected from the group consisting of a hydrogen atom, an aliphatic hydrocarbon group having 1 to 30 carbon atoms and an aromatic hydrocarbon group having 6 to 20 carbon atoms, n and m respectively and independently represent an integer of 0 to 10, provided that n and m respectively and independently represent an integer of 1 to 10 in the case Q does not contain an aliphatic hydrocarbon group that bonds to a terminal OH group, and at least one of $R_1$ and $R_2$ and at least one of $R_3$ and $R_4$ are respectively selected from the group consisting of a hydrogen atom and an aliphatic hydrocarbon group.

(4) The continuous production method according to any of (1) to (3), wherein the aliphatic diol compound is a primary diol compound.

(5) The continuous production method according to any of (1) to (4), wherein the boiling point of the aliphatic diol compound is 350° C. or lower.

(6) The continuous production method according to (1) or (2), wherein the aliphatic diol compound is a compound selected from the group consisting of pentacyclopentadecane dimethanol, 1,4-cyclohexane dimethanol, 1,3-adamantane dimethanol, decalin-2,6-dimethanol, tricyclodecane dimethanol, 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

(7) The continuous production method according to any of (1) to (6), wherein the terminal hydroxyl group concentration of the aromatic polycarbonate prepolymer obtained in step (A) is 1500 ppm or less.

(8) The continuous production method according to any of (1) to (7), wherein the N value (structural viscosity index) as represented by the following equation (I) of the high molecular weight polycarbonate resin is 1.30 or less.

$$N \text{ value} = (\log(Q160 \text{ value}) - \log(Q10 \text{ value}))/(\log 160 - \log 10) \quad (I)$$

(9) The continuous production method according to any of (1) to (8), wherein the weight average molecular weight (Mw) of the high molecular weight polycarbonate resin and the weight average molecular weight (MwPP) of the aromatic polycarbonate prepolymer obtained in step (A) are represented by the following equation (IV):

$$Mw = k' \times \text{retention time(min)} + Mw_{PP} \quad (IV)$$

wherein, k' (units: increase in Mw/min) is a numerical number of 500 or more.

(10) The continuous production method according to any of (1) to (9), wherein the linking and highly polymerizing reaction under a reduced pressure condition in step (C) is carried out using a linking and highly polymerizing reaction vessel, the linking and highly polymerizing reaction vessel is a single shaft horizontal stirred reaction vessel having a single stirring shaft or a multiple shaft horizontal stirred reaction vessel having a plurality of stirring shafts, at least one of the stirring shafts has a horizontal rotating shaft and mutually discontinuous impellers attached to the horizontal rotating shaft at nearly a right angle, a ratio L/D, when the length of the horizontal rotating shaft is defined as L and the rotating diameter of the impellers is defined as D, is 1 to 15, and an extraction port for the high molecular weight polycarbonate resin formed is provided on the opposite side from a feed port for the aromatic polycarbonate prepolymer.

(11) The continuous production method according to any of (9) to (10), wherein the linking and highly polymerizing reaction under a reduced pressure condition in step (C) is carried out using a linking and highly polymerizing reaction vessel, the linking and highly polymerizing reaction vessel is a single shaft horizontal kneading reaction vessel of the continuous screw type having a single stirring shaft or a multiple shaft horizontal kneading reaction vessel of the continuous screw type having a plurality of stirring shafts, a ratio L/D when the length of the stirring shaft is defined as L and the screw diameter is defined as D is 20 to 100, and an extraction port for the high molecular weight polycarbonate resin formed is provided on the opposite side from a feed port for the aromatic polycarbonate prepolymer.

(12) The continuous production method according to any of (1) to (11), wherein addition and mixing of the aliphatic diol compound with the aromatic polycarbonate prepolymer in step (B) is carried out using all inline mixer.

(13) The continuous production method according to (12), wherein the inline mixer is selected from the group consisting of a static mixer, a kneader and an extruder.

Effects of the Invention

Although raw materials are typically reacted after mixing well in polymerization methods of the prior art, since the reaction between an aromatic polycarbonate prepolymer and an aliphatic diol compound proceeds rapidly, if the raw materials are allowed to react after mixing well, reactions resulting in the formation of by-products such as phenol also proceed rapidly in the system, and a cleavage (fragmentation) reaction of the polymer main chain ends up proceeding due to the presence of those by-products. In the case a cleavage (fragmentation) reaction of the prepolymer main chain proceeds due to the presence of by-products, the reaction time of the highly polymerizing step for highly polymerizing must be prolonged, and as a result thereof, the resin is subjected to thermal hysteresis over a long period of time and resin quality tends to decrease.

In the present invention, as a result of mixing an aliphatic diol compound with an aromatic polycarbonate prepolymer under a specific condition and continuously supplying the resulting prepolymer mixture to a step for linking and highly polymerizing in a step for linking and highly polymerizing between the aromatic polycarbonate prepolymer and the aliphatic diol compound, the linking reaction can be allowed to proceed rapidly while inhibiting a cleavage (fragmentation) reaction attributable to by-products, thereby making it possible to shorten reaction time in the linking and highly polymerizing reaction vessel.

Namely, by obtaining a prepolymer compound by adding an aliphatic diol compound to an aromatic polycarbonate prepolymer at a pressure exceeding 200 torr, and supplying to a linking and highly polymerizing reaction vessel before the terminal hydroxyl group concentration of the aromatic polycarbonate prepolymer in the prepolymer mixture reaches 2000 ppm, a prepolymer mixture can be obtained without causing a decrease in addition rate (immobilization rate) while inhibiting volatilization even in the case of an aliphatic diol compound having a comparatively low boiling point, and the prepolymer mixture can be supplied to the linking and highly polymerizing reaction vessel without causing a decrease in molecular weight due to a cleavage (fragmentation) reaction.

In this manner, since the method of the present invention is able to minimize volatilization and eliminate the need for using in excess even in the case of an aliphatic diol compound having a comparatively low boiling point, the method is economically advantageous in the case of continuously producing industrially. In addition, a high molecular weight polycarbonate resin having an adequately high molecular weight, low N value, superior hue and little structural heterogeneity is obtained by an economically superior method. The method of the present invention can preferably use all applicable aliphatic diol compounds as linking agents. Among them, by using an aliphatic diol compound having a comparatively low boiling point that can be expected to be less expensive and available in stable supply in particular, the method of the present invention allows the obtaining of economic superiority and has greater value for industrial use.

BRIEF DESCRIPTION OF THE DRAWINGS

FIG. 1 is a schematic drawing showing an example of a production apparatus used in the production method of the present invention (production apparatus used in Example 1).

BEST MODE FOR CARRYING OUT THE INVENTION

The production method of the present invention comprises a step (A) for producing an aromatic polycarbonate prepolymer by using an aromatic dihydroxy compound and a diester carbonate as primary raw materials and subjecting these raw materials to a polycondensation reaction (transesterification reaction) (polycondensation step), a step (B) for obtaining a prepolymer mixture by adding an aliphatic diol compound to the aromatic polycarbonate prepolymer obtained in the aforementioned step (A) (mixing step), and a step (C) for subjecting the prepolymer mixture obtained in the aforementioned step (B) to a linking and highly polymerizing reaction under a reduced pressure condition (linking and highly polymerizing step). Step (C) is a step for highly polymerizing by linking the aromatic polycarbonate prepolymer with the aliphatic diol compound, and is also a copolymerization step using the aromatic polycarbonate prepolymer and the aliphatic diol compound as copolymerization components.

In the present invention, other conventionally known steps can also be combined, such as a primary raw material preparation step for preparing the primary raw materials in the form of the aromatic dihydroxy compound and the diester carbonate, a step for devolatilizing and removing unreacted raw materials and reaction by-products present in the reaction mixture following completion of the aforementioned steps (A) to (C), a step for adding an additive such as a heat stabilizer, mold release agent or colorant, or a pelletization step for molding the resulting high molecular weight polycarbonate resin into pellets of a prescribed particle diameter. In addition, a linking agent preparation step may also be included for preliminarily melting and dehydrating the aliphatic diol compound in order to rapidly and uniformly mix the aliphatic diol compound (linking agent) in the linking and highly polymerizing reaction vessel.

The following provides a more detailed explanation of modes for carrying out the present invention based on the drawing. As shown in FIG. 1 (schematic drawing specifically showing an example of a production apparatus used in the method of the present invention), in this example of the production method of the present invention, the high molecular weight polycarbonate resin of the present invention is produced by first going through a primary raw material preparation step for preparing primary raw materials in the form of an aromatic dihydroxy compound and a diester carbonate, and a polycondensation step (A) for forming an aromatic polycarbonate prepolymer by polycondensation of these raw materials in a molten state, followed by going through a step (B) for obtaining a prepolymer mixture by adding an aliphatic diol compound (linking agent) to the aromatic polycarbonate prepolymer obtained in the aforementioned step (A), and a step (C) for subjecting the prepolymer mixture obtained in the aforementioned step (B) to a linking and highly polymerizing reaction under a reduced pressure condition (linking and highly polymerizing step).

Subsequently, pellets of a high molecular weight polycarbonate resin are molded by stopping the reaction and going through a step for devolatilizing and removing unreacted raw materials and reaction by-products present in the polymerization reaction solution (not shown), a step for adding a heat stabilizer, mold release agent or colorant and the like (not shown), and a step for molding the polycarbonate into pellets of a prescribed particle diameter (not shown).

The method of the present invention employs a multistage reaction process, and step (A) and step (C) are carried out using respective and separate reaction vessels. The polycondensation reaction vessel used to carry out step (A) and the linking and highly polymerizing reaction vessel (trans-esterification vessel) used to carry out step (C) are connected in series through the mixer used to carry out step (B).

The polycondensation reaction vessel of step (A) may be composed of a single reaction vessel, or may be composed of a plurality of reaction vessels connected in series. Preferably two or more and more preferably two to six reaction vessels are connected in series.

On the other hand, the linking and highly polymerizing reaction vessel of step (C) may be composed of a single reaction vessel or may be composed of a plurality of reaction vessels connected in series, and it is preferably composed of a single vessel (single reaction vessel).

1. Primary Raw Material Preparation Step

In the primary raw material preparation step, the primary raw materials used in the production method of the present invention in the form of an aromatic dihydroxy compound and a diester carbonate are prepared.

(1) Apparatuses

Raw material mixing tanks (1Ra and 1Rb in FIG. 1) and a raw material feed pump (1P in FIG. 1) for supplying the prepared raw materials to the polycondensation step are provided as apparatuses used in the primary raw material preparation step. Primary raw materials in the form of an aromatic dihydroxy compound and diester carbonate are continuously supplied in a molten state from feed ports 1Ma and 1Mb to the raw material mixing tanks 1Ra and 1Rb in a nitrogen gas atmosphere. In the raw material mixing tanks 1Ra and 1Rb, the aromatic dihydroxy compound and the diester carbonate are mixed and melted at a prescribed molar ratio (preferably at a molar ratio of diester carbonate to aromatic dihydroxy compound of 1.0 to 1.3) in a nitrogen gas atmosphere to prepare a raw material mixed melt. There are no particular limitations on the specifications of the raw material mixing tanks 1Ra and 1Rb, and conventionally known mixing tanks can be used. For example, mixing tanks provided with Maxblend impellers (1Ya and 1Yb in FIG. 1) can be used.

Furthermore, two mixing tanks are preferably provided in the primary raw material preparation step as shown in FIG. 1 for the purpose of continuous production. As a result of providing two mixing tanks, mixing and melting can be alternately carried out, and the mixed primary raw materials can be continuously supplied to a reaction vessel 3R by switching a valve 1Bp.

(2) Aromatic Dihydroxy Compound

Examples of the primary raw material in the form of the aromatic dihydroxy compound include compounds represented by the following general formula (1).

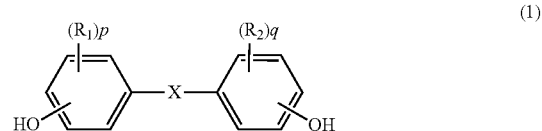

(1)

In general formula (1), although the two phenylene groups may both be p-phenylene groups, m-phenylene groups or o-phenylene groups and each may be located at different substitution sites, and both are preferably p-phenylene groups.

$R_1$ and $R_2$ in general formula (1) respectively and independently represent a halogen atom, nitro group, amino group, alkyl group having 1 to 20 carbon atoms, alkoxyl group having 1 to 20 carbon atoms, cycloalkyl group having 6 to 20 carbon atoms, aryl group having 6 to 20 carbon atoms, cycloalkoxyl group having 6 to 20 carbon atoms, aryloxy group having 6 to 20 carbon atoms or aralkyl group having 6 to 20 carbon atoms.

Preferable specific examples of $R_1$ and $R_2$ is a fluorine atom, amino group, methoxy group, methyl group, cyclohexyl group and phenyl group.

p and q represent integers of 0 to 4 and preferably integers of 0 to 2. X merely represents a mere bond or a group selected from divalent organic groups represented by the following general formula (2). $R_3$ and $R_4$ in general formula (2) respectively and independently represent a hydrogen atom, alkyl group having 1 to 10 carbon atoms (and preferably 1 to 6 carbon atoms) or aryl group having 6 to 10 carbon atoms, or $R_3$ and $R_4$ may form an aliphatic ring taken together with each other.

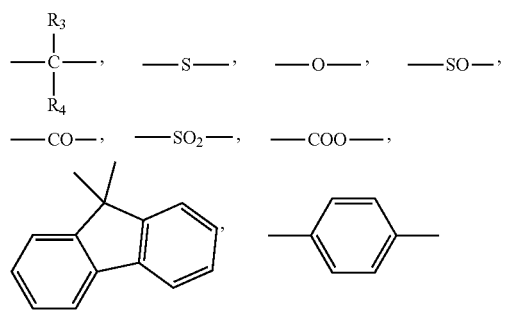

(2)

Specific examples of such aromatic dihydroxy compounds include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxy-3-isopropylphenyl)propane, 2,2-bis(4-hydroxyphenyl)butane, 2,2-bis(4-hydroxyphenyl)octane, 2,2-bis(3-t-butyl-4-hydroxyphenyl) propane, 2,2-bis(3-bromo-4-hydroxyphenyl)propane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3-cyclohexyl-4-hydroxyphenyl)propane, 1,1-bis(3-cyclohexyl-4-hydroxyphenyl)cyclohexane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 1,1-bis(4-hydroxyphenyl)-3,3,5-trimethylcyclohexane, 4,4'-dihydroxydiphenyl ether, 4,4'-dihydroxybiphenyl, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxy-3,3'-dimethylphenyl ether, 4,4'-dihydroxyphenyl sulfide, 4,4'-dihydroxy-3,3'-dimethylphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, 4,4'-dihydroxy-3,3'-dimethyldiphenyl sulfone, 4,4'-sulfonyl diphenol, 2,2'-diphenyl-4,4'-sulfonyl diphenol, 2,2'-dimethyl-4,4'-sulfonyl diphenol, 1,3-bis{2-(4-hydroxyphenyl) propyl}benzene, 1,4-bis{2-(4-hydroxyphenyl) propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol and 1,3-bis(4-hydroxyphenyl)-5,7-dimethyladamantane.

Among these, a particularly preferable example is 2,2-bis(4-hydroxyphenyl)propane (abbreviated as bisphenol A or BPA) for reasons such as its stability as a monomer and the ease of acquiring that containing a low level of impurities. A plurality of types of the aforementioned aromatic hydroxy compounds may also be combined as necessary.

In the present invention, a dicarboxylic acid compound such as terephthalic acid, isophthalic acid, naphthalene dicarboxylic acid or 1,4-cyclohexane dicarboxylic acid may be used in combination with the aforementioned aromatic dihydroxy compound as necessary, and may used in the form of a polyester carbonate.

In addition, a polyfunctional compound having three or more, and preferably three to six, functional groups in a molecule thereof can also be used in combination. Examples of such polyfunctional compounds used include compounds having phenolic hydroxyl groups or carboxyl groups, and 1,1,1-tris(4-hydroxyphenyl)ethane is used particularly preferably.

(3) Diester Carbonate

Examples of the diester carbonate used in the present invention include compounds represented by the following general formula (3).

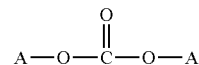

(3)

Here, A in general formula (3) represents a linear or branched monovalent hydrocarbon group having 1 to 10 carbon atoms that may t be substituted. The two groups represented by A may be the same or different.

Specific examples of diester carbonates include aromatic diester carbonates such as diphenyl carbonate, ditolyl carbonate, bis(2-chlorophenyl) carbonate, m-cresyl carbonate, dinaphthyl carbonate or bis(4-phenylphenyl) carbonate. In addition, diester carbonates such as dimethyl carbonate, diethyl carbonate, dibutyl carbonate or dicyclohexyl carbonate can also be used as desired. Among these, diphenyl carbonate is preferable in terms of reactivity and stability with respect to coloring of the resulting resin, and particularly with respect to cost.

(4) Feed Ratio

In the present invention, the diester carbonate is preferably used in excess with respect to the aromatic dihydroxy compound in order to introduce end-capped terminal groups during production of the aromatic polycarbonate prepolymer. More preferably, the feed ratio between the aromatic dihydroxy compound and the diester carbonate is such that the ratio of diester carbonate to aromatic dihydroxy compound is 1.0 to 1.3 (molar ratio). Namely, the diester carbonate is preferably used at a ratio of 1.0 to 1.3, more preferably at a ratio of 1.02 to 1.20, and particularly preferably at a ratio of 1.02 to 1.15, to a total of 1 mole of the aromatic dihydroxy compound.

(5) Catalyst

The polycondensation reaction between the aromatic dihydroxy compound and the diester carbonate in step (A) and the linking and highly polymerizing reaction between the aromatic polycarbonate prepolymer and aliphatic diol compound in step (C) may also be carried out in the presence of a catalyst. An ordinary transesterification catalyst such as a basic compound catalyst used as a catalyst for producing normal polycarbonates can be used for the catalyst. The catalyst can be added at any stage of immediately prior to step (A), step (A), step (B) or step (C), or at multistage from immediately prior to step (A) to step (C) according to the particular conditions.

In particular, examples of basic compound catalysts include alkaline metal compounds and/or alkaline earth metal compounds and nitrogen-containing compounds.

Examples of alkaline metal compounds and/or alkaline earth metal compounds that are used preferably include organic acid salts, inorganic salts, oxides, hydroxides, hydrides, alkoxides, quaternary ammonium hydroxides or salts thereof and amines of alkaline metals and alkaline earth metals, and these compounds can be used alone or in combination.

Specific examples of alkaline metal compounds include sodium hydroxide, potassium hydroxide, cesium hydroxide, lithium hydroxide, sodium bicarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium tetraphenyl boride, sodium benzoate, potassium benzoate, cesium benzoate, lithium benzoate, disodium hydrogen phosphate, dipotassium hydrogen phosphate, dilithium hydrogen phosphate, disodium phenylphosphate, or disodium salts, dipotassium salts, dicesium salts and dilithium salt of bisphenol A, or sodium salts, potassium salts, cesium salts and lithium salts of phenol.

Specific examples of alkaline earth metal compounds include magnesium hydroxide, calcium hydroxide, strontium hydroxide, barium hydroxide, magnesium bicarbonate, calcium bicarbonate, strontium bicarbonate, barium bicarbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Specific examples of nitrogen-containing compounds include quaternary ammonium hydroxides having an alkyl group and/or aryl group such as tetramethyl ammonium hydroxide, tetraethyl ammonium hydroxide, tetrapropyl ammonium hydroxide, tetrabutyl ammonium hydroxide or trimethylbenzyl ammonium hydroxide, tertiary amines such as triethylamine, dimethylbenzylamine or triphenylamine, secondary amines such as diethylamine, primary amines such as propylamine or butylamine, imidazoles such as 2-methylimidazole, 2-phenylimidazole or benzoimidazole, and bases or basic salts such as ammonia, tetramethyl ammonium borohydride, tetrabutyl ammonium borohydride, tetrabutyl ammonium tetraphenyl borate, tetraphenyl ammonium tetraphenylborate or tetraphenyl phosphonium tetraphenylborate.

Examples of other transesterification catalysts that are used preferably include salts of zinc, tin, zirconium and lead, and these can be used alone or in combination.

Specific examples of these transesterification catalysts include zinc acetate, zinc benzoate, zinc 2-ethylhexanoate, zinc (II) chloride, zinc (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate and lead (IV) acetate.

In the production method of the present invention, cesium carbonate ($Cs_2CO_3$), sodium bicarbonate ($NaHCO_3$), sodium tetraphenyl boride, disodium phenylphosphate, potassium carbonate or tetramethyl ammonium hydroxide is used preferably. Among these, cesium carbonate, potassium carbonate and tetramethyl ammonium hydroxide are more preferable. These catalysts can be used alone or in combination.

These catalysts are used at a molar ratio of $1 \times 10^{-9}$ to $1 \times 10^{-3}$ moles and preferably $1 \times 10^{-7}$ to $1 \times 10^{-5}$ moles to 1 mole of a total of the dihydroxy compound.

2. Step (A) (Polycondensation Step)

In step (A), an aromatic polycarbonate prepolymer is produced by a polycondensation reaction of primary raw materials in the form of an aromatic dihydroxy compound and diester carbonate in a polycondensation reaction vessel. This polycondensation reaction is a melt polycondensation reaction based on a transesterification reaction.

(1) Apparatuses

One or two or more reaction vessels are used for the polycondensation reaction vessel used to carry out step (A). In the case of using two or more reaction vessels, the reaction vessels are connected in series. Preferably 2 or more, more preferably 2 to 6, and particularly preferably 3 to 5 reaction vessels are used by connecting in series. The polycondensation reaction vessels may be of the vertical type or horizontal type, and they are preferably of the vertical type.

In FIG. 1, for example, a first vertical stirred reaction vessel 3R, a second vertical reaction vessel 4R, a third vertical stirred reaction vessel 5R and a fourth vertical stirred reaction vessel 6R are provided as polycondensation reaction vessels of step (A).

Each of these polycondensation reaction vessels can be provided with a stirring device such as a conventionally known impeller. Specific examples of impellers include an anchor impeller, Maxblend impeller and double helical ribbon impeller.

For example, the first vertical stirred reaction vessel 3R, the second vertical stirred reaction vessel 4R and the third vertical stirred reaction vessel 5R of FIG. 1 are respectively provided with Maxblend impellers 3Y, 4Y and 5Y, while the fourth vertical stirred reaction vessel 6R is provided with a double helical ribbon impeller 6Y.

In addition, each of the reaction vessels can be provided with a preheter, a gear pump, an effluent pipe for discharging by-products and the like formed by the polycondensation reaction, a condenser such as a condenser or dry ice trap, a holding vessel such as a recovery tank, or a vacuum device for maintaining in a prescribed state of reduced pressure.

Furthermore, all of the reaction vessels used in a series of a continuous production method are adjusted to as to reach preset internal temperature and pressure ranges.

In the example of a continuous production method using the production apparatus shown in FIG. 1, 5 reaction vessels connected in series (step (A): first vertical stirred reaction vessel 3R, second vertical stirred reaction vessel 4R, third vertical stirred reaction vessel 5R, fourth vertical stirred reaction vessel 6R; step (B): mixer (6Mix), and step (C): fifth horizontal stirred reaction vessel 7R) are first respectively preset to an internal temperature and pressure corresponding to each reaction (melt polycondensation reaction and linking and highly polymerizing reaction).

In the apparatus of FIG. 1, for example, preheaters 3H, 4H, 5H and 6H and gear pumps 3P, 4P, 5P and 6P are provided. In addition, effluent pipes 3F, 4F, 5F and 6F are attached to four of the reaction vessels. The effluent pipes 3F, 4F, 5F and 6F are respectively connected to condensers 3C, 4C, 5C and 6C, and each reaction vessel is maintained in a prescribed state of reduced pressure by vacuum devices 3V, 4V, 5V and 6V.

(2) Polycondensation Reaction

Reaction conditions in the polycondensation reaction vessel are respectively set so that temperature and vacuum increase while stirring rate decreases as the polycondensation reaction progresses. During the polycondensation reaction, the liquid level is controlled so that the average retention time in each reaction vessel, such as that in the reaction vessels prior to the start of addition of linking agent, is about 30 minutes to 120 minutes. In addition, phenol formed as a by-product simultaneous to the melt polycondensation reaction in each reaction vessel is discharged outside the system by the effluent pipes 3F, 4F, 5F and 6F attached to each reaction vessel. The degree of vacuum in step (A) is preferably 100 torr to 0.0075 torr (13.3 kPa to 1 Pa), and the internal temperature of the reaction vessels is preferably 140° C. to 300° C.

More specifically, in the method shown in FIG. 1, step (A) is carried out with four reaction vessels (first to fourth vertical stirred reaction vessels), and temperature and pressure are normally set in the manner described below. Furthermore, the following explanation applies similarly to the mixer of step (B) and linking and highly polymerizing reaction vessel (fifth horizontal stirred reaction vessel) connected in series to the four reaction vessels of step (A).

(Preheater 1H) 180° C. to 230° C.
(First vertical stirred reaction vessel 3R)
Internal temperature: 150° C. to 250° C., pressure: normal pressure to 100 torr (13.3 kPa), heating medium temperature: 220° C. to 280° C.
(Preheater 3H) 200° C. to 250° C.
(Second vertical stirred reaction vessel 4R)
Internal temperature: 180° C. to 250° C., pressure: 100 torr (13.3 kPa) to 75 torr (10 kPa), heating medium temperature: 220° C. to 280° C.
(Preheater 4H) 230° C. to 270° C.
(Third vertical stirred reaction vessel 5R)
Internal temperature: 220° C. to 270° C., pressure: 75 torr (10 kPa) to 1 torr (133 Pa), heating medium temperature: 220° C. to 280° C.
(Preheater 5H) 230° C. to 270° C.
(Fourth vertical stirred reaction vessel 6R)
Internal temperature: 220° C. to 280° C., pressure: 1 torr (133 Pa) to 0.0075 torr (1 Pa), heating medium temperature: 220° C. to 300° C.
(Preheater 6H) 270° C. to 340° C.
(Mixer 6Mix)
Internal temperature: 220° C. to 300° C., pressure: 200 torr to 3700 torr, heating medium temperature: 220° C. to 320° C.
(Fifth horizontal stirred reaction vessel 7R)
Internal temperature: 260° C. to 340° C., pressure: 10 torr or lower (1333 Pa or lower), heating medium temperature: 260° C. to 340° C.

Next, after the internal temperature and pressure in all of the reaction vessels used in the continuous production method of the present invention have reached a range of −5% to +5% of their respective set values, raw material mixed melts separately prepared in raw material mixing tanks 1R (1Ra and 1Rb) are continuously supplied to the first vertical stirred reaction vessel 3R via the raw material feed pump 1P and the preheater 1H. In addition, simultaneous to starting supply of the raw material mixed melts, a catalyst is continuously supplied from a catalyst feed port 1Cat at an intermediate location in the transfer line of the raw material mixed melts into the first vertical stirred reaction vessel 3R, after which melt polycondensation begins based on a transesterification reaction.

Although there are no particular limitations on the rotating speed of the reaction vessel impellers, it is preferably maintained at 200 rpm to 10 rpm. The polycondensation reaction is carried out while maintaining the liquid level at a constant level so as to achieve a prescribed average retention time while discharging phenol formed as a by-product as the reaction progresses from the effluent pipe. There are no particular limitations on the average retention time in each reaction vessel, and it is normally 30 minutes to 120 minutes.

In the production apparatus of FIG. 1, for example, the melt polycondensation reaction is carried out by setting the inside of the first vertical stirred reaction vessel 3R to a temperature of 200° C. and pressure of 200 torr (27 kPa) in a nitrogen atmosphere, and maintaining the rotating speed of the Maxblend impeller 3Y at 160 rpm. The melt polycondensation reaction is then carried out while maintaining the liquid level at a constant level while discharging by-product phenol from the effluent pipe 3F so that the average retention time is 60 minutes.

Continuing, the polymerization reaction solution is discharged from the bottom of the first vertical stirred reaction vessel 3R by the gear pump 3P, after which it is sequentially supplied through the preheater 3H to the second vertical stirred reaction vessel 4R, through the preheater 4H to the third vertical stirred reaction vessel 5R by the gear pump 4P, and finally through the preheater 5H to the fourth vertical stirred reaction vessel 6R by the gear pump 5P, thereby causing the polycondensation reaction to progress and form the aromatic polycarbonate prepolymer.

(3) Aromatic Polycarbonate Prepolymer

There are no particular limitations on the weight average molecular weight of the aromatic polycarbonate prepolymer obtained in the final polycondensation reaction vessel of step (A), and it is preferably 10000 to 50000 and more preferably 1500 to 35000 (in terms of polystyrene standard as determined by GPC), and this prepolymer is continuously supplied to the mixing step of step (B).

In addition, the proportion of sealed ends composed by aromatic monohydroxy compounds among the total number of ends in the aromatic polycarbonate prepolymer obtained in the final polycondensation reaction vessel of the aforementioned step (A) is preferably 60% or more. The terminal hydroxyl group concentration of the aromatic polycarbonate prepolymer obtained in the final polycondensation reaction vessel of step (A) is preferably 1,500 ppm or less, more preferably 1,000 ppm or less, further preferably 750 ppm or less, and particularly preferably 500 ppm or less. In the case of a terminal hydroxyl group concentration in excess of this range or a number of sealed ends that is below this range, a polycarbonate resin of sufficient molecular weight may not be able to be obtained.

In the present description, the proportion of sealed ends to the total number of ends and the hydroxyl group concentration of a polymer (including the prepolymer and high molecular weight polycarbonate resin) can be analyzed by $^1$H-NMR analysis of the polymer. The specific $^1$H-NMR analysis method is subsequently described in the Examples below. The terminal hydroxyl group concentration in the polymer can also be measured by spectrometry using a Ti complex. More specifically, a method is employed whereby terminal hydroxyl group concentration (OH concentration) in the polymer is measured by UV-visible absorption spectroscopic analysis (wavelength: 546 nm) of a complex formed from the polymer and methane tetrachloride in methylene chloride solution in compliance with the method described in Maromoleculare Chemie 88 (1965) 215-231. The Hitachi Model U-3500 UV-Visible Spectrophotometer can be used for the apparatus, for example. Terminal hydroxyl group concentration (OH concentration) in the polymer is determined based on UV-visible absorption spectroscopic analysis of a known concentration of a complex formed from BPA and titanium tetrachloride.

The "total amount of terminal groups of the aromatic polycarbonate prepolymer" referred to here is calculated based on, for example, the total amount of terminal groups being 1 mole if there are 0.5 moles of branch-free polycarbonate (or linear polycarbonate).

Specific examples of end-capped terminal groups include a phenyl terminal, cresyl terminal, o-tolyl terminal, p-tolyl terminal, p-tert-butylphenyl terminal, biphenyl terminal, o-methoxycarbonylphenyl terminal and p-cumylphenyl terminal. Among these, terminal groups composed of low-boiling-point, aromatic monohydroxy compounds that are easily removed from the reaction system in the linking and highly polymerizing reaction together with the aliphatic diol compound are preferable, and a phenyl terminal or p-tert-butylphenyl terminal is particularly preferable.

In the melting method, end-capped terminal groups can be introduced by using the diester carbonate in excess with respect to the aromatic dihydroxy compound during production of the aromatic polycarbonate prepolymer. Although varying according to the apparatus used for the reaction and the reaction conditions, the specific amount of diester carbonate used with respect to 1 mole of the aromatic dihydroxy compound is preferably 1.0 mole to 1.3 moles, more preferably 1.02 moles to 1.20 moles, and particularly preferably 1.02 moles to 1.15 moles. As a result, an aromatic polycarbonate prepolymer is obtained that satisfies the aforementioned requirement for the number of end-capped terminal groups.

3. Step (B) (Mixing Step)

In step (B), an aliphatic diol compound is added to the aromatic polycarbonate prepolymer obtained in the aforementioned step (A) to obtain a prepolymer mixture.

(1) Aliphatic Diol Compound (Linking Agent)

The aliphatic diol compound used in the continuous production method of the present invention is a compound having aliphatic hydrocarbon groups that bond to terminal hydroxyl groups (OH groups). Here, a terminal hydroxyl group refers to a hydroxyl group that contributes to the formation of a carbonate bond with the aromatic polycarbonate prepolymer by a transesterification reaction.

Examples of aliphatic hydrocarbon groups include alkylene groups and cycloalkylene groups, and a portion thereof may be substituted with an aromatic group or heterocycle-containing group and the like. More specifically, examples of aliphatic diol compounds include compounds having divalent alcoholic hydroxyl groups represented by the following general formula (A).

HO—(CR$_1$R$_2$)$_n$-Q-(CR$_3$R$_4$)$_n$—OH     (A)

In the aforementioned general formula (A), Q represents a hydrocarbon group having 3 or more carbon atoms that may contain a heteroatom. The lower limit of the number of carbon atoms of this hydrocarbon group is 3, preferably 6 and more preferably 10, while the upper limit thereof is preferably 40, more preferably 30 and even more preferably 25.

Examples of the heteroatom include an oxygen atom (O), sulfur atom (S), nitrogen atom (N), fluorine atom (F) and silicon atom (Si). Among these, an oxygen atom (O) and sulfur atom (S) are particularly preferable.

The hydrocarbon group may be linear, branched or cyclical. In addition, Q may contain a cyclic structure such as an aromatic ring or heterocycle.

In the aforementioned general formula (A), R$_1$, R$_2$, R$_3$ and R$_4$ respectively and independently represent a group selected from the group consisting of a hydrogen atom, aliphatic hydrocarbon group having 1 to 30 carbon atoms and preferably 1 to 10 carbon atoms, and aromatic hydrocarbon group having 6 to 20 carbon atoms and preferably 6 to 10 carbon atoms.

Specific examples of aliphatic hydrocarbon groups include linear or branched alkyl groups and cyclohexyl groups. Examples of alkyl groups include a methyl group, ethyl group, propyl group, isopropyl group, n-butyl group, i-butyl group, t-butyl group, n-amyl group, isoamyl group, n-hexyl group and isohexyl group.

Examples of aromatic hydrocarbon groups include aryl groups and naphthyl groups. Examples of aryl groups include a phenyl group, phenethyl group, benzyl group, tolyl group and o-xylyl group, and a phenyl group is preferable.

However, at least one of R$_1$ and R$_2$ and at least one of R$_3$ and R$_4$ are respectively selected from the group consisting of a hydrogen atom and aliphatic hydrocarbon group.

R$_1$ to R$_4$ respectively and independently, particularly preferably represent a group selected from the group consisting of a hydrogen atom and aliphatic hydrocarbon group having 1 to 30 carbon atoms and preferably 1 to 10 carbon atoms.

Particularly preferable examples of aliphatic hydrocarbon groups include linear or branched alkyl groups. Examples of these alkyl groups include a methyl group, ethyl group, propyl group, isopropyl group, n-butyl group, i-butyl group, t-butyl group and isoamyl group.

n and m respectively and independently represent an integer of 0 to 10 and preferably an integer of 0 to 4. However, in the case Q does not contain an aliphatic hydrocarbon group that bonds to a terminal hydroxyl group, n and m respectively and independently represent an integer of 1 to 10 and preferably an integer of 1 to 4.

The aliphatic diol compound is preferably that in which R$_1$ to R$_4$ are all hydrogen atoms. Namely, the aliphatic diol compound used in the present invention is preferably a primary diol compound, and more preferably a primary diol compound with the exception of linear aliphatic diols.

On the other hand, in the present invention, a secondary diol in which at least one of R$_1$ to R$_4$ is an aliphatic hydrocarbon group or n and m are 0 and Q is a branched aliphatic hydrocarbon group can also be used.

Examples of the aliphatic diol compound more preferably include a compound having divalent alcoholic hydroxyl groups represented by any of the following general formulae (i) to (iii).

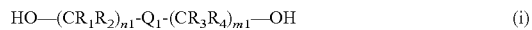

HO—(CR$_1$R$_2$)$_{n1}$-Q$_1$-(CR$_3$R$_4$)$_{m1}$—OH     (i)

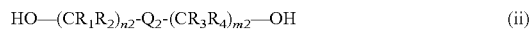

HO—(CR$_1$R$_2$)$_{n2}$-Q$_2$-(CR$_3$R$_4$)$_{m2}$—OH     (ii)

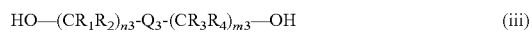

HO—(CR$_1$R$_2$)$_{n3}$-Q$_3$-(CR$_3$R$_4$)$_{m3}$—OH     (iii)

In the aforementioned general formulae (i) to (iii), R$_1$ to R$_4$ respectively and independently represent a group selected from the group consisting of a hydrogen atom, an aliphatic hydrocarbon group having 1 to 30 carbon atoms and preferably 1 to 10 carbon atoms, and an aromatic hydrocarbon group having 6 to 20 carbon atoms and preferably 6 to 10 carbon atoms. Specific examples thereof are the same as those listed for the aforementioned general formula (A).

In the aforementioned general formula (1), Q$_1$ represents a hydrocarbon group having 6 to 40 carbon atoms that contains an aromatic ring, and preferably a hydrocarbon group having 6 to 30 carbon atoms that contains an aromatic ring. In addition, Q$_1$ may contain at least one type of heteroatom selected from the group consisting of an oxygen atom (O), sulfur atom (S), nitrogen atom (N), fluorine atom (F) and silicon atom (Si).

n1 and m1 respectively and independently represent an integer of 1 to 10 and preferably an integer of 1 to 4. Examples of an aromatic rings include a phenyl group, biphenyl group, fluorenyl group and naphthyl group.

In the aforementioned general formula (ii), $Q_2$ represents a linear or branched hydrocarbon group having 3 to 40 carbon atoms that may contain a heterocycle, and preferably a linear or branched hydrocarbon group having 3 to 30 carbon atoms that may contain a heterocycle. $Q_2$ is particularly preferably a linear hydrocarbon group having 3 to 40 carbon atoms, and more preferably 3 to 30 carbon atoms, which has a branch and does not contain a heterocycle.

In addition, $Q_2$ may also contain at least one type of heteroatom selected from the group consisting of an oxygen atom (O), sulfur atom (S), nitrogen atom (N), fluorine atom (F) and silicon atom (Si). n2 and m2 respectively and independently represent an integer of 0 to 10 and preferably an integer of 0 to 4.

In the aforementioned general formula (iii), $Q_3$ represents a group that contains a cyclic hydrocarbon group (cycloalkylene group) having 6 to 40 carbon atoms and preferably a group that contains a cyclic hydrocarbon group having 6 to 30 carbon atoms. n3 and m3 respectively and independently represent an integer of 0 to 10 and preferably an integer of 1 to 4. Examples of cycloalkylene groups include a cyclohexyl group, bicyclodecanyl group and tricyclodecanyl group.

Among the aliphatic diol compounds represented by any of the aforementioned general formulae (i) to (iii), compounds represented by general formulae (i) and (ii) are more preferable, and compounds represented by general formula (ii) are particularly preferable. In addition, the aliphatic diol compound represented by any of the aforementioned general formulae (i) to (iii) is particularly preferably a primary diol compound and even more preferably a primary diol compound with the exception of linear aliphatic diols.

Specific examples of aliphatic diol compounds represented by any of the aforementioned general formulae (i) to (iii) of the present invention that can be used are as indicated below when classified as primary diols and secondary diols.

(i) Primary Diols: 2-Hydroxyethoxy Group-Containing Compounds

Preferable examples of the aliphatic diol compound of the present invention include 2-hydroxyethoxy group-containing compounds represented by HO—(CH$_2$)$_2$—O—Y—O—(CH$_2$)$_2$—OH. Here, examples of Y include organic groups (A), organic groups (B), organic groups (C) selected from divalent phenylene groups or naphthalene groups each having the structures indicated below, and cycloalkylene groups (D) selected from the following structural formulae.

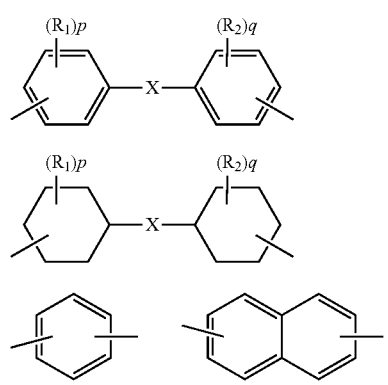

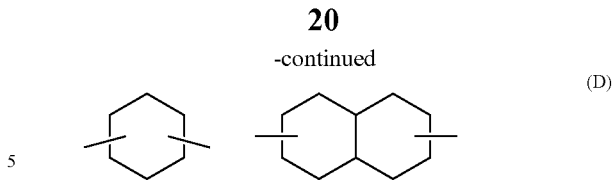

Here, X represents a single bond or group having one of the structures indicated below. $R_1$ and $R_2$ respectively and independently represent a hydrogen atom, alkyl group having 1 to 4 carbon atoms, phenyl group or cycloalkyl group, and each may contain a fluorine atom. $R_1$ and $R_2$ are preferably hydrogen atoms or methyl groups. p and q respectively and independently represent an integer of 0 to 4 (and preferably 0 to 3).

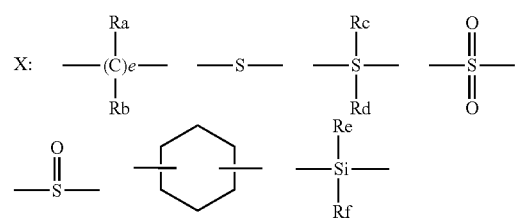

In the aforementioned structures, Ra and Rb respectively and independently represent a hydrogen atom, linear or branched alkyl group having 1 to 30 carbon atoms, preferably 1 to 12 carbon atoms, more preferably 1 to 6 carbon atoms and particularly preferably 1 to 4 carbon atoms, an aryl group having 6 to 12 carbon atoms or a cycloalkyl group having 6 to 12 carbon atoms, or Ra and Rb may mutually bond to form a ring.

Examples of rings include aromatic rings, aliphatic rings and heterocycles (containing O and/or S atoms) and arbitrary combinations thereof. In the case Ra and Rb are alkyl groups or form a ring taken together, they may also contain a fluorine atom. Rc and Rd respectively and independently represent an alkyl group having 1 to 10 carbon atoms, preferably 1 to 6 carbon atoms, and more preferably 1 to 4 carbon atoms (and particularly preferably represent a methyl group or ethyl group), and they may contain a fluorine atom. e represents an integer of 1 to 20 and preferably an integer of 1 to 12.

Re and Rf respectively and independently represent a hydrogen atom, halogen atom, linear or branched alkyl group having 1 to 10 carbon atoms, aryl group having 6 to 12 carbon atoms, cycloalkyl group having 6 to 12 carbon atoms or alkoxyl group having 1 to 20 carbon atoms, and they may contain a fluorine atom. In addition, they may form a ring taken together. Examples of linear or branched alkyl groups preferably include those having 1 to 6 carbon atoms and more preferably those having 1 to 4 carbon atoms, and are particularly preferably a methyl group or ethyl group. An alkoxyl group having 1 to 20 carbon atoms is preferably a methoxy group or ethoxy group.

More specific examples of the aliphatic diol compound are indicated below. In the following formulae, n and m respectively and independently represent an integer of 0 to 4. $R_1$ and $R_2$ respectively and independently represent a hydrogen atom, methyl group, ethyl group, n-propyl group, butyl group, isopropyl group, isobutyl group, phenyl group or cyclohexyl group.

<Cases in which Y Represents an Organic Group (A)>

Preferable examples of compounds in which Y is an organic group (A) are indicated below.

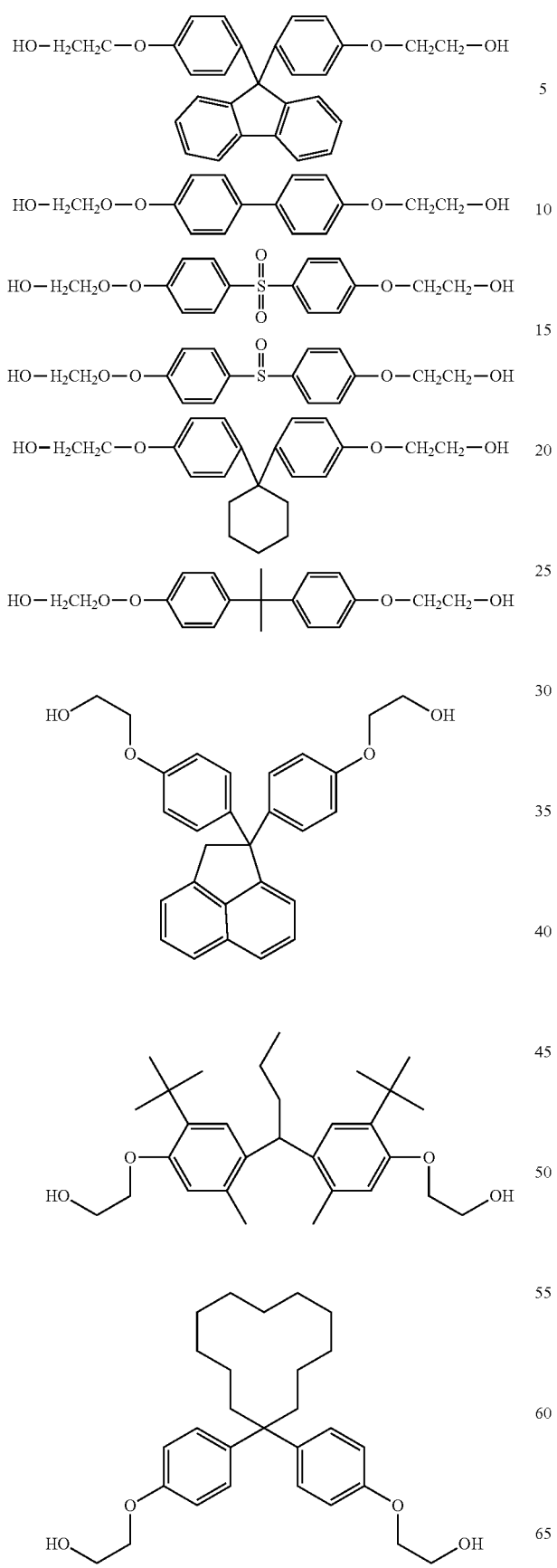
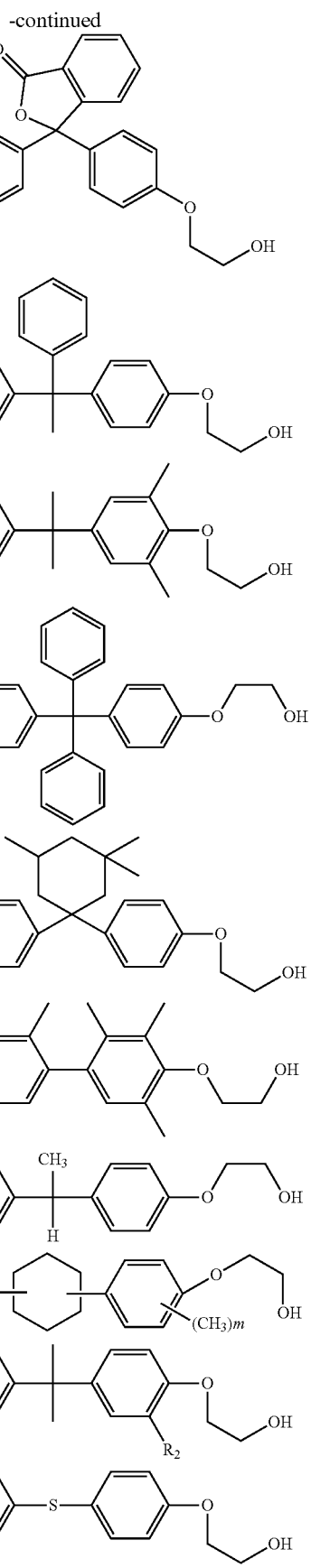

<Cases in which Y Represents an Organic Group (B)>

In cases in which Y represents an organic group (B), X preferably represents —CRaRb— (wherein, Ra and Rb respectively and independently represent a hydrogen atom or alkyl group having 1 to 6 carbon atoms, and preferably a methyl group). Specific examples include the compounds indicated below.

<Cases in which Y Represents an Organic Group (C)>

Preferable examples of compounds in the case Y represents an organic group (C) are indicated below.

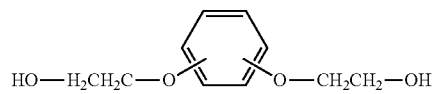

Particularly preferable examples of the aforementioned 2-hydroxyethoxy group-containing compounds are indicated below.

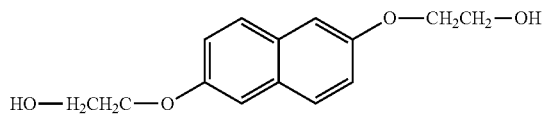
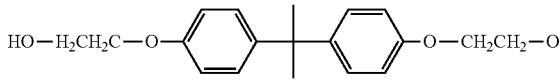
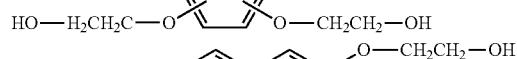
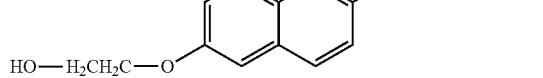

(ii) Primary Diols: Hydroxyalkyl Group-Containing Compounds

Preferable examples of the aliphatic diol compound of the present invention include hydroxyalkyl group-containing compounds represented by HO—(CH$_2$)$_r$—Z—(CH$_2$)$_r$—OH. Here, r is 1 or 2. Namely, hydroxyalkyl groups consist of hydroxymethyl groups and hydroxyethyl groups.

Examples of Z include the organic groups indicated below.

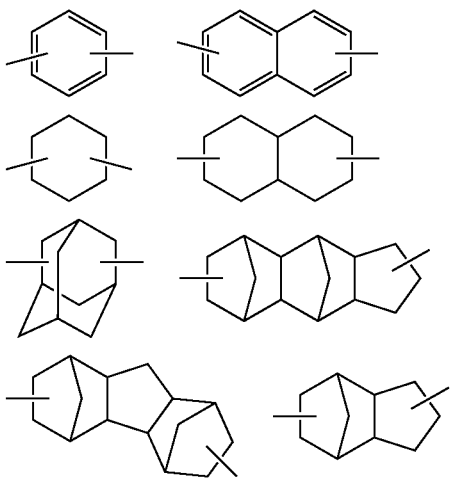

Preferable examples of hydroxyalkyl group-containing compounds are indicated below. In the following formulae, n and m respectively and independently represent an integer of 0 to 4.

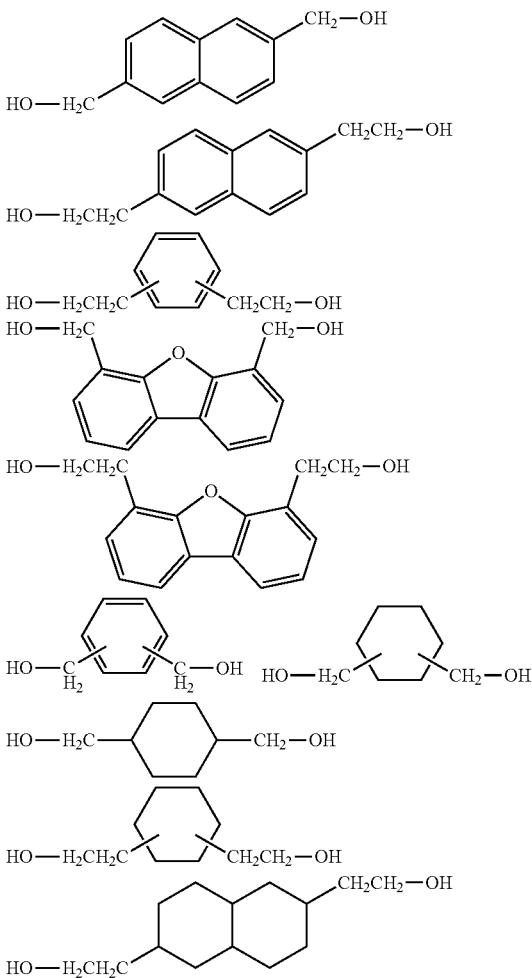

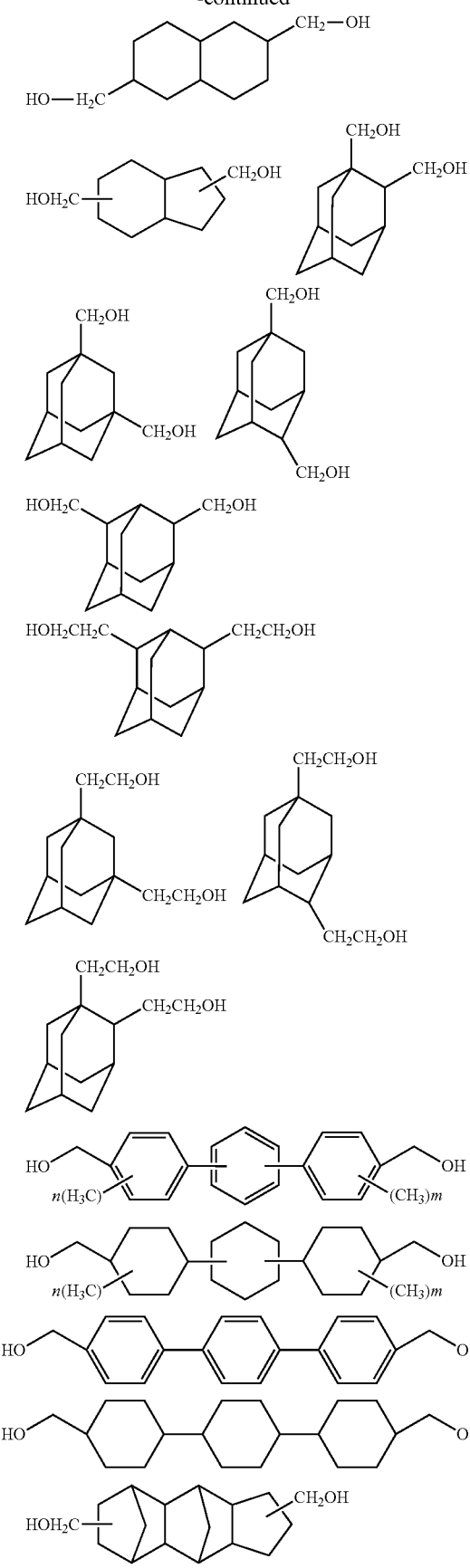

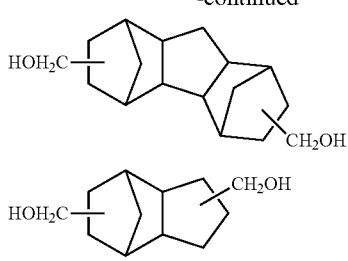

(iii) Primary Diols: Carbonate Diol-Based Compounds

Preferable examples of the aliphatic diol compound of the present invention include carbonate diol-based compounds represented by the following formulae. Here, examples of R include organic groups having the structures indicated below. In the following formulae, n is an integer of 1 to 20 and preferably an integer of 1 to 2. m is an integer of 3 to 20 and preferably an integer of 3 to 10.

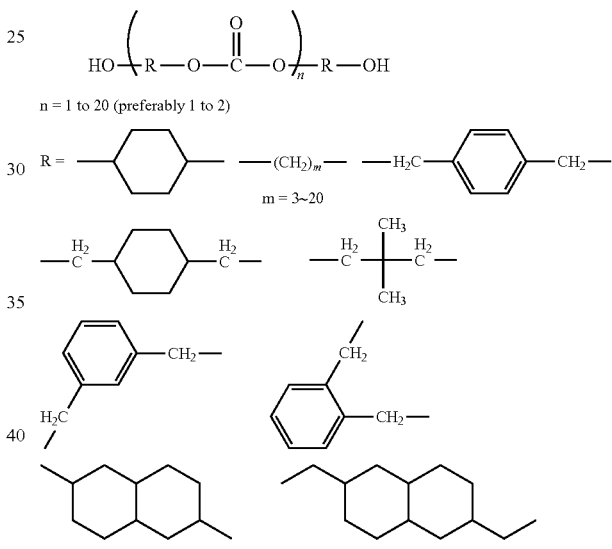

Preferable examples of the aforementioned polycarbonate diol-based compounds include the diols indicated below (dimers of cyclohexane dimethanol or neopentyl glycol) and compounds having these diols as main components thereof.

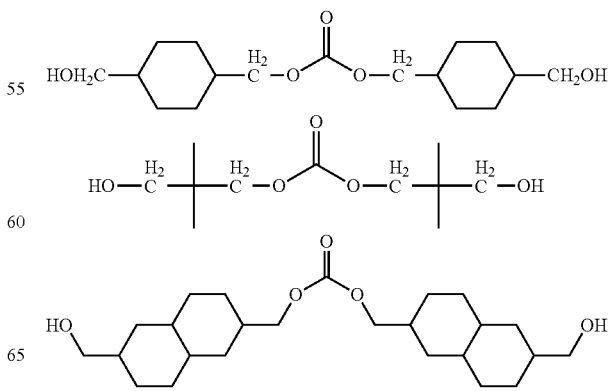

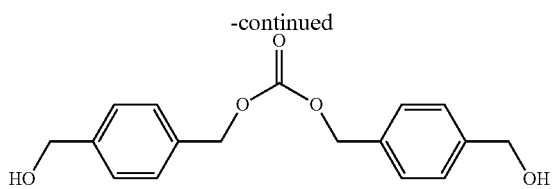

A primary diol selected from the group consisting of the aforementioned (i) 2-hydroxyethoxy group-containing compounds, (ii) hydroxyalkyl group-containing compounds, and (iii) carbonate diol-based compounds is preferably used for the aliphatic diol compound of the present invention.

Furthermore, the aliphatic diol compound of the present invention is not particularly limited to the aforementioned specific primary diols, but rather there are some primary diol compounds or secondary diol compounds that can be used in addition to the aforementioned primary diols. Examples of other primary diol compounds or secondary diol compounds that can also be used are indicated below.

Furthermore, in the following formulae, $R_1$ and $R_2$ respectively and independently represent a hydrogen atom, halogen atom, amino group, nitro group, alkyl group having 1 to 20 carbon atoms, alkoxyl group having 1 to 20 carbon atoms, cycloalkyl group having 6 to 20 carbon atoms, aryl group having 6 to 20 carbon atoms, cycloalkoxy group having 6 to 20 carbon atoms, or aryloxy group having 6 to 20 carbon atoms, and preferably represent a hydrogen atom, fluorine atom, methyl group, ethyl group, propyl group, i-propyl group, n-butyl group, i-butyl group, sec-butyl group, tert-butyl group, pentyl group, isoamyl group, cyclohexyl group, phenyl group, benzyl group, methoxy group or ethoxy group.

$R_5$, $R_6$, $R_7$ and $R_8$ are hydrogen atoms or monovalent alkyl groups having 1 to 10 carbon atoms. $R_9$ and $R_{10}$ respectively and independently represent a linear or branched alkyl group having 1 to 8 carbon atoms and preferably 1 to 4 carbon atoms.

Ra and Rb respectively and independently represent a hydrogen atom, linear or branched alkyl group having 1 to 30 carbon atoms, preferably 1 to 12 carbon atoms, more preferably 1 to 6 carbon atoms and particularly preferably 1 to 4 carbon atoms, aryl group having 6 to 12 carbon atoms or cycloalkyl group having 6 to 12 carbon atoms, or may form a ring taken together with each other. Examples of rings include aromatic rings, aliphatic rings and heterocycles (containing O and/or S), as well as arbitrary combinations thereof. In the case Ra and Rb represent alkyl groups or form a ring taken together with each other, they may contain a fluorine atom.

R' is an alkylene group having 1 to 10 carbon atoms and preferably 1 to 8 carbon atoms. Re and Rf respectively and independently represent a hydrogen atom, halogen atom, methyl group, ethyl group, n-propyl group, isopropyl group, butyl group, isobutyl group, phenyl group, methoxy group or ethoxy group. m' is an integer of 4 to 20 and preferably an integer of 4 to 12. m" is an integer of 1 to 10 and preferably an integer of 1 to 5. e is an integer of 1 to 10.

<Other Primary Diols>

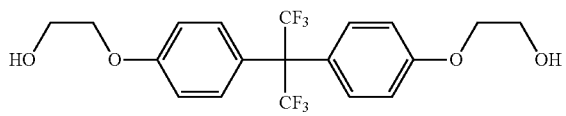

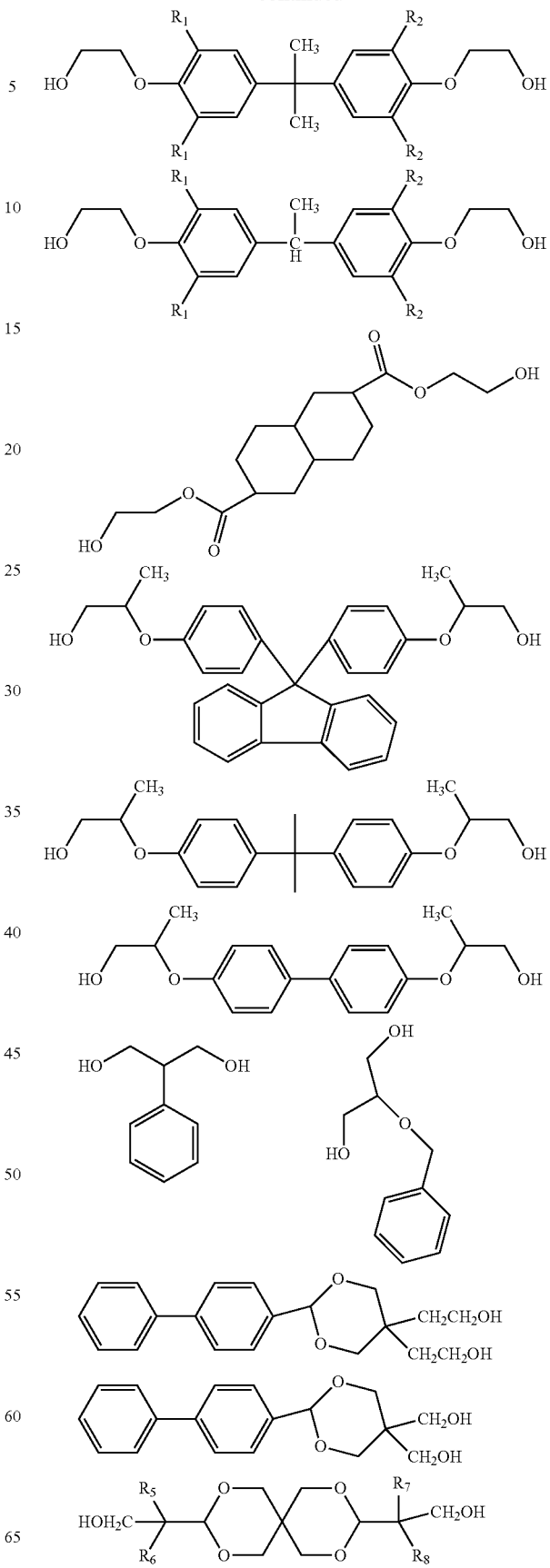

-continued
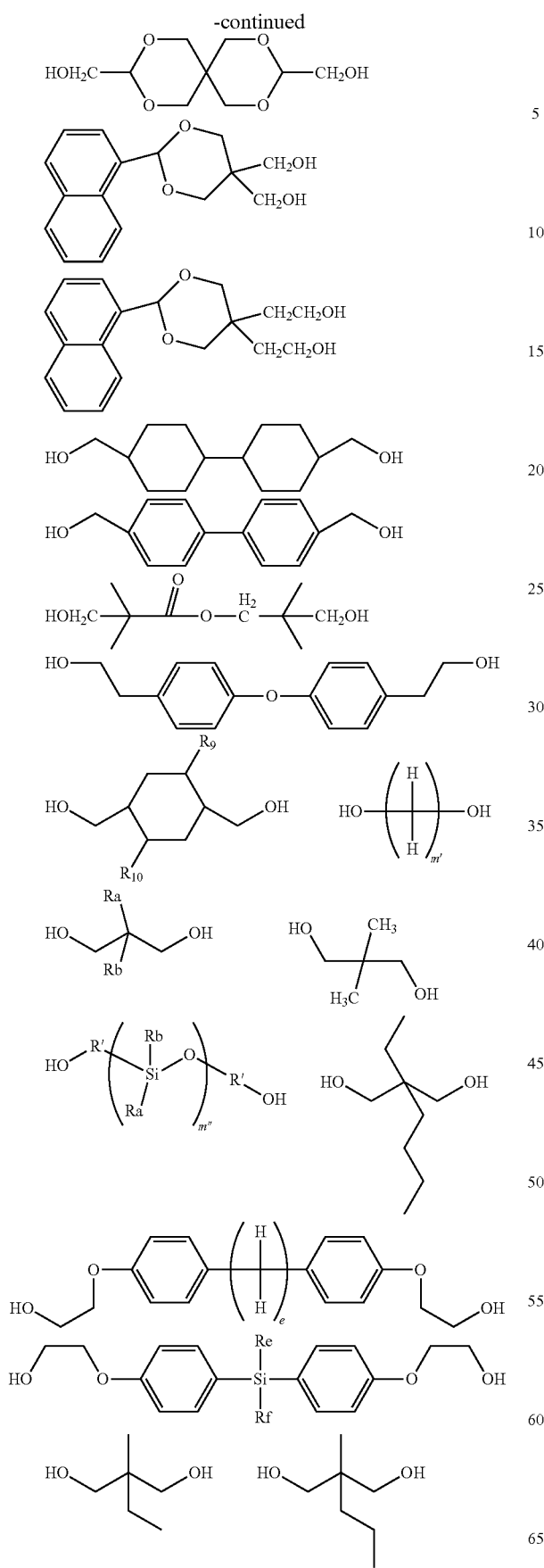
<Secondary Diols>
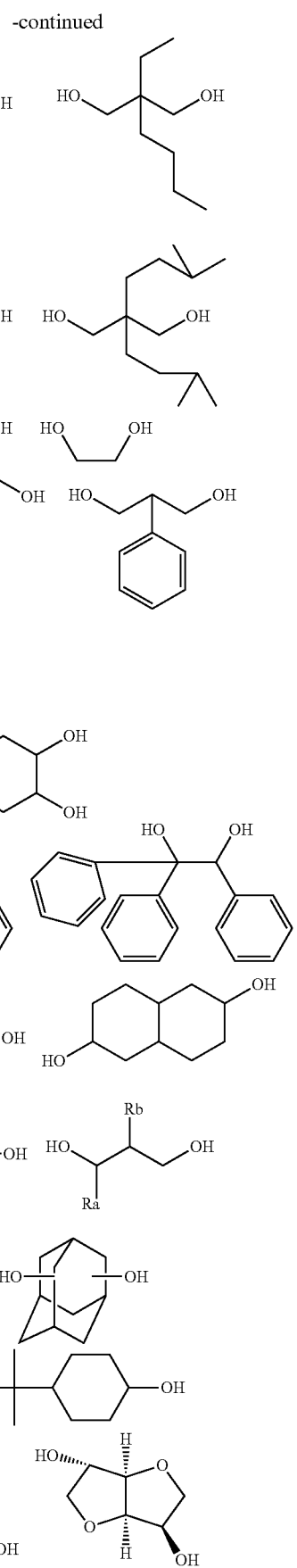

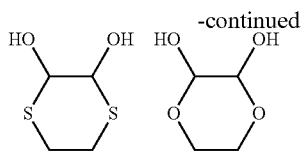

More specific examples of aliphatic diol compounds used in the present invention include aliphatic diols containing a cyclic structure such as 1,4-cyclohexanediol, 1,4-cyclohexane dimethanol, 1,6-cyclohexane dimethanol, tricyclo[5.2.1.0$^{2.6}$]decane dimethanol, decalin-2,6-dimethanol, pentacyclopentadecane dimethanol, isosorbide, isomannide or 1,3-adamantane dimethanol; aliphatic diols containing an aromatic ring such as p-xylylene glycol, m-xylylene glycol, naphthalene dimethanol, biphenyl dimethanol, 1,4-bis(2-hydroxyethoxy)phenyl, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol or fluorene diethanol; aliphatic polyester diols such as polycaprolactone diol, poly(1,4-butanediol adipate)diol or poly(1,4-butanediol succinate)diol; branched aliphatic diols such as 2-butyl-2-ethylpropane-1,3-diol (butylethylpropane glycol), 2,2-diethylpropane-1,3-diol, 2,2-diisobutylpropane-1,3-diol, 2-ethyl-2-methylpropane-1,3-diol, 2-methyl-2-propylpropanediol or 2-methylpropane-1,3-diol; and carbonate diol-based compounds such as bis(3-hydroxy-2,2-dimethylpropyl)carbonate.

The aforementioned aliphatic diol compounds may be used alone or two or in combination of two or more types of these. Furthermore, the types of aliphatic diol compounds that are actually able to be used may differ according to reaction conditions and the like, and can be suitably selected according to the reaction conditions used and the like.

There are no particular limitations on the upper limit of the boiling point of the aliphatic diol compound used in the present invention, and a boiling point of 500° C. or lower is adequate. Furthermore, according to the method of the present invention, even an aliphatic diol compound having a comparatively low boiling point is able to efficiently contribute to the linking reaction for increasing molecular weight without causing a decrease in the addition rate (immobilization rate). Accordingly, the aliphatic diol compound used in the present invention is more preferably that having a comparatively low boiling point of 350° C. or lower.

In this manner, even if using an aliphatic diol compound having a comparatively low boiling point, the method of the present invention is economically advantageous for continuous production on an industrial scale since volatilization is minimized and the need to use in excess is eliminated.

On the other hand, there are no particular limitations on the lower limit of the boiling point of the aliphatic diol compound used in the present invention. In consideration of removal of aromatic monohydroxy compounds formed as by-products accompanying the reaction between the aromatic polycarbonate prepolymer and the aliphatic diol compound, the aliphatic diol compound used is preferably that having a boiling point that is higher than the aromatic monohydroxy compounds. In addition, it is also necessary that the reaction be allowed to proceed reliably without causing volatilization at a constant temperature and pressure.

Accordingly, more preferable specific examples of the aforementioned aliphatic diol compound include 1,4-cyclohexanediol, 1,6-cyclohexanediol (boiling point: 283° C.), decalin-2,6-dimethanol (341° C.), pentacyclopentadecalin dimethanol, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol, fluorene diethanol, 2-butyl-2-ethylpropane-1,3-diol (271° C.), 2,2-diethylpropane-1,3-diol (250° C.), 2,2-diisobutylpropane-1,3-diol (280° C.), bis(3-hydroxy-2,2-dimethylpropyl)carbonate, 2-ethyl-2-methylpropane-1,3-diol (226° C.), 2-methyl-2-propylpropane-1,3-diol (230° C.) and propane-1,2-diol (188° C.).

Particularly preferable specific examples of the aforementioned aliphatic diol compound are selected from the group consisting of pentacyclopentadecane dimethanol, 1,4-cyclohexane dimethanol, 1,3-adamantane dimethanol, decalin-2,6-dimethanol, tricyclodecane dimethanol, 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol. Among these, 2-butyl-2-ethylpropane-1,3-diol is more preferable.

The amount of the aliphatic diol compound used is preferably 0.01 moles to 1.0 mole, more preferably 0.1 moles to 1.0 mole, even more preferably 0.1 moles to 0.5 moles and particularly preferably 0.2 moles to 0.4 moles to 1 mole of the total amount of end groups of the aromatic polycarbonate prepolymer.

If the amount of the aliphatic diol compound used exceeds the aforementioned ranges, an insertion reaction occurs in which the aliphatic diol compound is inserted into the main chain of the aromatic polycarbonate resin as a copolymer component, and since the copolymerization ratio thereof increases, copolymerization has a considerable effect on physical properties. As a result, although it is possible to improve those properties, this is not desirable as an effect of highly polymerization of the aromatic polycarbonate. In addition, an amount that is below the aforementioned ranges is also not desirable since there is little effect on highly polymerization.

(2) Apparatus of Step (B)

In step (B), a mixer is provided by connecting in series to the polycondensation reaction vessel of step (A) (connected to the final polycondensation reaction vessel in the case of using a plurality of reaction vessels in step (A)). More specifically, in the apparatus of FIG. 1, a mixer 6Mix is provided connected in series after the fourth vertical stirred reaction vessel 6R, and the aliphatic diol compound (linking agent) is supplied to the mixer 6Mix from linking agent preparation devices (2Ra, 2Rb). The single fifth horizontal stirred reaction vessel 7R is provided connected in series to the mixer 6Mix, and the prepolymer mixture is continuously supplied thereto from the mixer 6Mix.

There are no particular limitations on the mixer used in step (B) provided it is used to prepare a conventionally known resin mixture, and an inline mixer is used preferably.

An inline mixture refers to a mixer for directly mixing two or more types of fluids (gas and/or liquid) present in a line to obtain a homogeneous mixture. Examples of this inline mixer include a static mixer, dynamic mixer, planetary mixer, anchor mixer, kneader, extruder, twin-screw high-speed kneader and continuous blender.

Examples of static mixers include a Sulzer mixer manufactured by Sulzer Ltd. (Model SMX or Model SMB-H), a static mixer manufactured by Tokyo Nisshin Jabara Co., Ltd. (Model WB-32A), and a static mixture manufactured by Noritake Co., Ltd.

Examples of kneaders include the KRC Kneader and KRC Reactor manufactured by Kurimoto, Ltd., and the NES•KO Kneader manufactured by Chemical Engineering Co., Ltd.

Examples of twin-screw high-speed kneaders include the Model FCM kneader manufactured by the Farrel Corp. (U.S.A.), and the Model LCM kneader manufactured by Kobe Steel Ltd., and the Model CIM and Model CPM kneaders manufactured by Japan Steel Works Ltd.

Examples of extruders include the Model ZSK twin-screw extruder manufactured by Werner and Pfleiderer GmbH (Germany).

Examples of continuous blenders include the Model NES•KO blender manufactured by Chemical Engineering Co., Ltd.

The aromatic polycarbonate prepolymer and aliphatic diol compound in step (B) of the present invention are mixed at a pressure exceeding 200 torr, preferably 500 torr or higher, more preferably 700 torr or higher, and even more preferably normal pressure (760 torr). If mixed at pressure below 200 torr, aliphatic diol compounds having a comparatively low boiling point easily volatilize, thereby causing a decrease in the addition rate (immobilization rate). Here, addition rate (immobilization rate) refers to the proportion of the aliphatic diol compound added that reacts with the aromatic polycarbonate prepolymer in the subsequent step (C) and contributes to a linking and highly polymerization.

In addition, the aromatic polycarbonate prepolymer obtained in step (A) has a high proportion of end-capped terminal groups and a comparatively low terminal hydroxyl group concentration (in which the terminal hydroxyl group concentration thereof is preferably 1,500 ppm or less), and when the aliphatic diol compound is added thereto, in addition to the reaction between the ends of the aromatic polycarbonate prepolymer and the aliphatic diol compound proceeding extremely rapidly, a cleavage (fragmentation) reaction of the aromatic polycarbonate prepolymer proceeds due to the presence of phenol and other by-products formed by the reaction, thereby resulting in an increase in the terminal hydroxyl group concentration of the aromatic polycarbonate prepolymer.

If the increase in the terminal hydroxyl group concentration caused by the cleavage (fragmentation) reaction is excessively large, the molecular weight of the aromatic polycarbonate prepolymer in the polymer mixture supplied to step (C) decreases excessively, then there is no increase in molecular weight (a highly polymerized product is not obtained), or a longer reaction time (retention time) is required in step (C) to obtain a high molecular weight polycarbonate. If the reaction time (retention time) in step (C) increases longer, the quality of the resulting high molecular weight polycarbonate resin decreases in terms of, for example, a higher N value, increased coloring and increased structural heterogeneity.

Accordingly, in the method of the present invention, it is necessary that the aromatic polycarbonate prepolymer and the aliphatic diol compound are mixed at a pressure exceeding 200 torr to obtain a prepolymer mixture, and then, the prepolymer mixture is subject to the linking and highly polymerizing reaction in step (C) under a reduced pressure condition before the terminal hydroxyl group concentration of the aromatic polycarbonate prepolymer in the prepolymer mixture reaches 2000 ppm. More specifically, the prepolymer mixture is continuously supplied to the linking and highly polymerizing reaction vessel of step (C) before the terminal hydroxyl group concentration of the aromatic polycarbonate prepolymer in the prepolymer mixture reaches 2000 ppm.

The terminal hydroxyl group concentration of the aromatic polycarbonate prepolymer in the prepolymer mixture when supplied to the linking and highly polymerizing reaction vessel is preferably less than 1800 ppm and more preferably less than 1600 ppm.

More ideally, the mixing time, mixing temperature and other mixing conditions are preferably set so that only one end of the added aliphatic diol compound reacts with the aromatic polycarbonate prepolymer. Namely, the aromatic polycarbonate prepolymer obtained in step (A), the aliphatic diol compound, and a reactant resulting from reaction of the aliphatic diol compound with the aromatic polycarbonate prepolymer (and more preferably a reactant obtained as a result of only one end of the aliphatic diol compound reacting with the aromatic polycarbonate prepolymer) are contained in the prepolymer mixture obtained in step (B).

Furthermore, the aforementioned prepolymer mixture may also contain, in addition to the aforementioned compounds, cyclic carbonates derived from the aliphatic diol compound and aromatic monohydroxy compounds such as phenol present as reaction by-products. In addition, unreacted raw material monomers may also be contained.

There are no particular limitations on the mixing time in step (B) provided it is a time to a degree that the terminal hydroxyl group concentration of the aromatic polycarbonate prepolymer as previously described does not reach 2000 ppm, and it can be suitably set corresponding to other mixing conditions (such as mixing temperature or type of mixer), and it is preferably 7 minutes or less, more preferably 5 minutes or less, and particularly preferably 3 minutes or less. Namely, the resulting prepolymer mixture is preferably supplied to the linking and highly polymerizing reaction vessel of step (C) and subject to a linking and highly polymerizing reaction under a reduced pressure condition within 7 minutes, preferably within 5 minutes and particularly preferably within 3 minutes from the time the aliphatic diol compound is added to the aromatic polycarbonate prepolymer in step (B).

If the mixing time is excessively long, a cleavage (fragmentation) reaction of the aromatic polycarbonate prepolymer proceeds, the molecular weight of the aromatic polycarbonate prepolymer in the prepolymer mixture supplied to step (C) may decrease excessively, and the quality of the resulting high molecular weight polycarbonate resin may decrease.

There are no particular limitations thereon, and the mixing temperature in step (B) is preferably 220° C. to 300° C. and more preferably 260° C. to 300° C.

There are no particular limitations on the weight average molecular weight of the aromatic polycarbonate prepolymer in the prepolymer mixture obtained in step (B), and it is preferably 10000 to 40000 and more preferably 12000 to 35000 (in terms of polystyrene standard as determined by GPC), and the prepolymer mixture that contains the aromatic polycarbonate prepolymer is continuously supplied to the linking and highly polymerizing step of step (C).

(3) Preparation of Aliphatic Diol Compound

When the aliphatic diol compound (linking agent) is supplied to the mixer of step (B), it can be supplied after first preparing in advance in a linking agent preparation tank and the like. For example, the aliphatic diol compound is preferably preliminarily melted to a liquid state in a linking agent melting device. At this time, the viscosity of the aliphatic diol compound is preferably 0.1 poise to 10000 poise and more preferably 1 poise to 100 poise. As a result of making the viscosity of the aliphatic diol compound to be within these ranges, the aliphatic diol compound can be supplied stably and quantitatively to the linking and highly polymerizing reaction vessel, and the reaction with the aromatic polycarbonate prepolymer can be carried out uniformly and rapidly.

In addition, the aliphatic diol compound is preferably preliminarily dehydrated in a molten state prior to supplying to the linking and highly polymerizing reaction vessel. In order to dehydrate the aliphatic diol compound to a degree that moisture does not effect the linking and highly polymerizing reaction, dehydration is carried out under reduced pressure of preferably 0.01 torr (1.3 Pa) to 300 torr (40 kPa) and within a temperature range that is 50° C. higher than the melting point of the aforementioned aliphatic diol compound. There are no particular limitations on the degree of dehydration, and the moisture content in the aliphatic diol compound following dehydration is preferably 3% by weight or less and more preferably 1% by weight or less.

4. Step (C) (Highly Polymerizing Step)

In step (C), the prepolymer mixture obtained in step (B) is subjected to a linking and highly polymerizing reaction under a reduced pressure condition to produce a high molecular weight polycarbonate resin.

In step (C), a linking and highly polymerizing reaction vessel is provided by connecting in series to the mixer of step (B). One type or two or more types of reaction vessels can be used for the linking and highly polymerizing reaction vessel used in step (C), and one type (single reaction vessel) is used preferably.

More specifically, in the apparatus of FIG. 1, a single fifth horizontal stirred reaction vessel 7R is provided connected in series to the mixer 6Mix, and the prepolymer mixture is continuously supplied from the mixer 6Mix. Specific conditions of temperature, pressure and the like of the fifth horizontal stirred reaction vessel 7R are set in the manner described below.

(Preheater 6H) 270° C. to 340° C.

(Fifth Horizontal Stirred Reaction Vessel 7R)

Internal temperature: 260° C. to 340° C., pressure: 10 torr or lower (1333 Pa or lower), heating medium temperature: 260° C. to 340° C.

A quantitative pump is preferably used to supply the prepolymer mixture to the linking and highly polymerizing reaction vessel with favorable quantitativity. Examples of quantitative pumps include a centrifugal pump, mixed flow pump, axial flow pump, plunger pump, diaphragm pump, piston pump, gear pump, vane pump and screw pump.

Moreover, since the pressure inside the linking and highly polymerizing reaction vessel is reduced, a back pressure valve is preferably provided in the line used to supply (pump) the prepolymer mixture from the quantitative pump to the linking and highly polymerizing reaction vessel at a location closer to the linking and highly polymerizing reaction vessel than the linking agent supply device, and preferably at a location within 50 cm from the linking and highly polymerizing reaction vessel, in order to feed (supply) to the system under reduced pressure. For example, in the apparatus shown in FIG. 1, a back pressure valve is provided at a location closer to the reaction vessel than the linking agent supply device in the line used to supply the prepolymer mixture from the aforementioned quantitative pump 2P to the horizontal stirred reaction vessel 7R.

In addition, the oxygen concentration in the linking and highly polymerizing reaction vessel is preferably 0.0001% by volume to 10% by volume and more preferably 0.0001% by volume to 5% by volume in order to prevent oxidative degradation of the aliphatic diol compound. The gas inside the reaction vessel is preferably replaced with gas having an oxygen concentration of 10% by volume or less and further devolatilized in order to obtain these oxygen concentration conditions.

A horizontal stirred reaction vessel is used for the linking and highly polymerizing reaction vessel used in the aforementioned step (C). The reaction vessel is preferably a single shaft horizontal stirred reaction vessel having a single stirring shaft or a multiple shaft horizontal stirred reaction vessel having a plurality of stirring shafts, at least one of the stirring shafts has a horizontal rotating shaft and mutually discontinuous impellers attached at nearly a right angle to the horizontal rotating shaft, and when the length of the horizontal rotating shaft is defined as L and the rotating diameter of the impellers is defined as D, the ratio of L/D is 1 to 15 and preferably 2 to 10. Among the reaction vessels described above, a multiple shaft horizontal stirred reaction vessel having a plurality of stirring shafts is more preferable.

In addition, a continuous screw type of single shaft horizontal stirred reaction vessel having a single shaft or multiple shaft horizontal stirred reaction vessel having a plurality of shafts, as exemplified by an extruder, can also be used in which, when the length of the stirring shaft is defined as L and the screw diameter is defined as D, the ratio of L/D is preferably 20 to 100 and more preferably 40 to 80. Among the aforementioned reaction vessels, a multiple shaft horizontal stirred reaction vessel having a plurality of stirring shafts is more preferable.

Each of these horizontal stirred reaction vessels preferably has an extraction port for the high molecular weight polycarbonate resin formed that is located on the opposite side from the feed port of the prepolymer mixture.

A conventionally known stirring device such as an impeller can be provided in the linking and highly polymerizing reaction vessel. Specific examples of impellers include a twin-shaft impeller, paddle blade impeller, grid type impeller, spectacle-shaped impeller and extruder equipped with a screw.

In addition, an extractor can be provided in the aforementioned linking and highly polymerizing reaction vessel. An extraction device is preferably used since the high molecular weight polycarbonate resin (polycarbonate copolymer) obtained in the aforementioned linking and highly polymerizing reaction vessel is a highly viscous resin having fluidity at 280° C. of about 2500 Pa·s (or about 5.3 g/10 min in terms of melt mass flow rate as determined based on ISO 1133), and there are cases in which it may be difficult to extract the resin from the linking and highly polymerizing reaction vessel. Specific examples of extractors include a gear pump or screw extractor, and a screw extractor is used preferably.

For example, a twin-shaft impeller 7Y and a screw extractor 7P are provided in the fifth horizontal stirred reaction vessel 7R of FIG. 1.

In addition, an effluent pipe, condenser such as a condenser or dry ice trap, holding vessel such as a recovery tank, or vacuum device for maintaining a state of prescribed reduced pressure can be provided in each reaction vessel to discharge by-products and the like formed by the reaction.

For example, an effluent pipe 7F is attached to the fifth horizontal stirred reaction vessel 7R of FIG. 1. The effluent pipe 7F is connected to a condenser 7C, and the reaction vessel is maintained in a state of a prescribed reduced pressure by a vacuum device 7V.

In addition, in the aforementioned horizontal stirred reaction vessel, an extractor for the resulting polycarbonate resin is preferably provided on the opposite side from the feed port of the prepolymer mixture. A gear pump or screw extractor is preferably used for the extractor, and a screw extractor is used particularly preferably.

Moreover, a sealing mechanism containing a mechanical seal is preferably employed for the shaft seal of the aforementioned rotating shaft.

There are no particular limitations on surface renewability of the linking and highly polymerizing reaction vessel used in the aforementioned step (C) in order to efficiently remove by-product aromatic hydroxy compounds, a surface renewal effect represented by the following equation (II) is preferably within the range of 0.01 to 500, more preferably within the range of 0.01 to 100 and particularly preferably within the of 0.01 to 50.

$$\text{Surface renewal effect} = A \times Re^{0.5} \times n \div V \quad \text{(II)}$$

A: Surface area (m$^2$)
n: No. of rotations/s
V: Liquid volume (m$^3$)
Re (Reynolds number): $Re = \rho \times n \times r^2 \div \mu$
ρ: Liquid density (kg/m$^3$)
r: Impeller radius (m)
μ: Liquid viscosity (kg/m·s)

The material of the reaction vessels used in the production method of the present invention is preferably at least one type of material selected from the group consisting of (a) metal having an iron content of 1% by weight or less, (b) stainless steel containing 1% by weight or more of a metal selected from the group consisting of Mo, Ti, Zr and Nb, and (c) glass in a region that accounts for at least 90% of the total surface area of the portion which contacts the raw material monomer or the reaction mixture (to be referred to as the "liquid contact portion"). In the case the aforementioned material is glass, the amount of alkaline metal eluted when immersed in pure water at 50° C. for 120 hours is preferably 15 ppb/cm$^2$ or less.

In the present invention, although most preferably the liquid contact portions of all of the reaction vessels used in the production method of the present invention are composed of the aforementioned materials, the liquid contact portions of all the reaction vessels are not necessarily required to be composed of those materials, but rather at least the liquid contact portions of the linking and highly polymerizing reaction vessel used in the aforementioned step (C) are preferably composed of the aforementioned materials.

In addition, the reaction vessels used in the production method of the present invention are preferably subjected to electrolytic polishing in a region that accounts for at least 90% of the total surface area of the liquid contact portions thereof.

Although most preferably the liquid contact portions of all of the reaction vessels used in the production method of the present invention are subjected to electrolytic polishing, the liquid contact portions of all the reaction vessels are not necessarily required to be subjected to electrolytic polishing, but rather at least the liquid contact portion of the linking and highly polymerizing reaction vessel used in the aforementioned step (C) is preferably subjected to electrolytic polishing.

The following indicates specific examples of a preferable reaction vessel of the present invention as described above, but the reaction vessel is not limited thereto.

1) Specific examples of a multiple shaft horizontal stirred reaction vessel having a plurality of stirring shafts in which at least one of the stirring shafts has a horizontal rotating shaft and mutually discontinuous impellers attached at nearly a right angle to the horizontal rotating shaft, and in which, when the length of the horizontal rotating shafts is defined as L and the rotating diameter of the impellers is defined as D, the ratio L/D is 1 to 15, include a Spectacle-shaped blade polymerizer (Hitachi, Ltd.), Continuous LIST Kneader Reactor (List Inc.), AP-Reactor (List Inc.), SCR (Mitsubishi Heavy Industries, Ltd.) and KRC Reactor (Kurimoto, Ltd.).

2) Specific examples of a single shaft horizontal stirred reaction vessel having a single shaft in which the stirring shaft has a horizontal rotating shaft and mutually discontinuous impellers attached at nearly a right angle to the horizontal rotating shaft, and in which, when the length of the horizontal rotating shaft is defined as L and the rotating diameter of the impellers is defined as D, the ratio L/D is 1 to 15, include a Continuous LIST Kneader Reactor (List Inc.).

3) Specific examples of a continuous screw type of multiple shaft horizontal stirred reaction vessel having a plurality of stirring shafts in which, when the length of the stirring shafts is defined as L and the screw diameter is defined as D, the ratio L/D is 20 to 100, include members of the TEX series of twin-screw extruders (Japan Steel Works Ltd.), members of the TEM series of twin-screw extruders (Toshiba Machine Co., Ltd.), and the Model ZSK Twin-Screw Extruder (Werner and Pfleiderer GmbH).

4) Specific examples of a continuous screw type of single shaft horizontal stirred reaction vessel having a single stirring shaft in which, when the length of the stirring shaft is defined as L and the screw diameter is defined as D, the ratio L/D is 20 to 100, include a Buss Ko-Kneader (Buss, Inc.).

5. Continuous Production Method

The following provides a detailed explanation of an example of the continuous production method of the present invention based on FIG. 1.

The aromatic polycarbonate prepolymer obtained in the polycondensation reaction vessel of step (A) (the final reaction vessel in the case of using a plurality of reaction vessels in step (A)) is supplied to the mixer of step (B). On the other hand, the linking agent (aliphatic diol compound) that has been melted and dehydrated under reduced pressure in a linking agent preparation device is supplied (pumped) directly to the mixer from the linking agent preparation device. The aromatic polycarbonate prepolymer and aliphatic diol compound that have been supplied to the mixer are then mixed in the mixer and continuously supplied to the linking and highly polymerizing reaction vessel of step (C) in the form of the prepolymer mixture.

For example, in the production apparatus shown in FIG. 1, prepolymer discharged from the fourth vertical stirred reaction vessel 6R is sequentially and continuously supplied through the preheater 6H to the mixer 6Mix by the gear pump 6P. On the other hand, linking agent is continuously supplied from feed ports (2Ma, 2Mb) to the linking agent preparation tanks (2Ra, 2Rb), after which the molten linking agent is continuously supplied to the mixer 6Mix via the linking agent quantitative feed pump 2P.

The prepolymer mixture that has been discharged from the mixer 6Mix is sequentially and continuously supplied to the fifth horizontal stirred reaction vessel 7R, and the linking and highly polymerizing reaction proceeds under temperature and pressure conditions suitable for carrying out the linking and highly polymerizing reaction in the fifth horizontal stirred reaction vessel 7R. By-product phenol and a portion of unreacted monomers are removed outside the system through a venting conduit 7F.

Equipment such as double-walled pipes, in which the aliphatic diol compound flows over the inside and heating medium flows over the outside, as well as jacketed, and more preferably fully jacketed valve, pumps and the like can be used for feed lines of the aliphatic diol compound, valves, pumps and other equipment in order to prevent solidification of the aliphatic diol compound.

In step (C), although the retention time of the reaction mixture in the linking and highly polymerizing reaction vessel (time from the time the prepolymer mixture is supplied to the time the resulting high molecular weight polycarbonate resin is extracted) tends to be dependent on the reaction device (reaction vessel) used and therefore cannot be uniformly defined, it is preferably 60 minutes or less, more preferably 1 minute to 60 minutes, even more preferably 5 minutes to 60 minutes, further preferably 20 minutes to 60 minutes, further preferably 25 minutes to 60 minutes, and particularly preferably 30 minutes to 60 minutes.

According to the method of the present invention, in a method for continuously producing a high molecular weight polycarbonate resin by preliminarily mixing an aromatic polycarbonate prepolymer and aliphatic diol compound in a mixer, followed by continuously supplying to a linking and highly polymerizing reaction vessel and subjecting to a linking and highly polymerizing reaction, the aromatic polycarbonate prepolymer and the aliphatic diol compound are mixed at a pressure of 200 torr or more to obtain a prepolymer mixture, and then, the prepolymer mixture is continuously supplied to a linking and highly polymerizing reaction vessel before the terminal hydroxyl group concentration of the aromatic polycarbonate prepolymer in the prepolymer mixture reaches 2000 ppm, whereby the prepolymer mixture can be subjected to the linking and highly polymerizing reaction while inhibiting volatilization of the aliphatic diol compound and inhibiting decreases in molecular weight of the aromatic polycarbonate prepolymer. As a result, a high-quality, high molecular weight polycarbonate resin can be produced that has a low N value, favorable color tone and in which increases in structural heterogeneity have been inhibited.

The reaction conditions in step (C) are set so that high surface renewability can be secured at high temperature and high vacuum by selecting suitable polymerization devices and impellers.

The reaction temperature inside the linking and highly polymerizing reaction vessel in step (C) is normally within the range of 270° C. to 340° C. and preferably within the range of 280° C. to 320° C., and the reaction pressure is normally 10 torr or lower (1333 Pa or lower), preferably 2.0 torr or lower (267 Pa or lower), more preferably 0.01 torr to 1.5 torr (1.3 Pa to 200 Pa), and even more preferably 0.01 torr to 1.0 torr (1.3 Pa to 133 Pa). Consequently, a sealing mechanism including a mechanical seal is preferably used for the seals of stirring shafts.

In step (C), it is desirable to control the liquid level so that the average retention time of the reaction mixture of the linking and highly polymerizing reaction is preferably 60 minutes or less, more preferably 5 minutes to 60 minutes and even more preferably about 10 minutes to 45 minutes. In addition, by-product phenol in the reaction vessel is distilled off through an effluent pipe.

Furthermore, in the production apparatus shown in FIG. 1, phenol and other by-products are continuously liquefied and recovered from the condensers 3C and 4C respectively attached to the first vertical stirred reaction vessel 3R and the second vertical stirred reaction vessel 4R. The condensers 3C and 4C are respectively divided into two or more condensers, and if all or a portion of effluent condensed in the condenser closest to the reaction vessel is allowed to flow back to the first vertical stirred reaction vessel 3R and second vertical stirred reaction vessel 4R, the raw material molar ratio can be easily controlled, thereby making this preferable. In addition, cold traps (not shown) are respectively provided in downstream from the condensers 5C, 6C and 7C respectively attached to the third vertical stirred reaction vessel 5R, the fourth vertical stirred reaction vessel 6R and the fifth horizontal stirred reaction vessel 7R, enabling by-products to be continuously solidified and recovered.

Furthermore, the recovered by-products can be subsequently reused (recycled) by going through hydrolysis or purification steps and the like. Examples of main by-products include phenol and other aromatic monohydroxy compounds and unreacted aliphatic diol. Following recovery of phenol in particular, the phenol can be recycled by supplying to a diphenyl carbonate production step. In addition, in the case of the formation of by-product cyclic carbonates derived from the aliphatic diol compound, these cyclic carbonates can also be similarly recovered and recycled.

In this manner, in the continuous production apparatus shown in FIG. 1, a raw material mixed melt and a catalyst are continuously supplied via a preheater after the internal temperatures and pressures of five reaction vessels have reached prescribed levels, at which time melt polycondensation based on a transesterification reaction is initiated. Consequently, the average retention time of the polymerization reaction solution in each reaction vessel is equal to that during steady state operation starting immediately after the start of melt polycondensation. Moreover, since low molecular weight prepolymers are linked with each other with an aliphatic diol compound having a rapid transesterification reaction rate and highly polymerization is achieved in a short period of time, the resulting high molecular weight product is not subjected to thermal hysteresis beyond that which is necessary and is resistant to the occurrence of branching. In addition, color tone is also favorable.

One of the characteristics of the method of the present invention is that highly polymerization can be achieved in a short period of time following initiation of the reaction with the aliphatic diol compound in step (C). For example, weight average molecular weight (Mw) can be increased at the rate of 500 or more, preferably 600 or more, and more preferably 700 or more per minute of retention time during the short retention time of the present invention.

More specifically, according to the method of the present invention, the relationship between the weight average molecular weight of the aromatic polycarbonate prepolymer obtained in step (A) ($Mw_{PP}$) and the weight average molecular weight of the high molecular weight polycarbonate resin obtained in step (C) (Mw) can be represented with the following equation (IV). In the following equation (IV), k' (units: increase in Mw/min) is a numerical number of 500 or more.

$$Mw = k' \times \text{retention time(min)} + Mw_{PP} \qquad (IV)$$

According to the method of the present invention, the numerical number k' in the aforementioned equation (IV) can be made to be 500 or more, preferably 600 or more and more preferably 700 or more. Namely, molecular weight can be increased to reach a prescribed high molecular weight in a short time of period from the start of the reaction in step (B).

The weight average molecular weight (Mw) of the high molecular weight polycarbonate resin obtained with the continuous production method of the present invention is preferably 35,000 to 100,000, more preferably 35,000 to 80,000 and particularly preferably 40,000 to 75,000.

Since a polycarbonate resin having a high molecular weight has high melt tension and is resistant to the occurrence of drawdown, it is preferable for applications such as blow molding and extrusion molding. In addition, it also demonstrates favorable moldability such as not resulting in the occurrence of cobwebbing even in the case of using in injection molding. Moreover, the resulting molded product has superior mechanical properties, heat resistance, organic solvent resistance and other physical properties.

In addition, the high molecular weight polycarbonate resin of the present invention has high fluidity despite its high molecular weight, and the lower limit of Q value (280° C., 160 kg load) serving as an indicator of fluidity is preferably 0.02 ml/sec, more preferably 0.022 ml/sec, even more preferably 0.025 ml/sec, particularly preferably 0.027 ml/sec, and most preferably 0.03 ml/sec. The upper limit of the Q value is preferably 1.0 ml/sec and more preferably 0.5 ml/sec. In general, the melt characteristics of polycarbonate resins can be indicated by $Q=K \cdot P^N$. In the equation, Q value is flow volume of the melt resin (ml/sec), K is an independent variable of one side of a regression formula (derived from the molecular weight and structure of the polycarbonate resin), P is the pressure measured at 280° C. using a constant-load, orifice-type flow tester (load: 10 kgf to 160 kgf) (kg/cm$^2$), and N represents the structural viscosity index. A high Q value indicative of high fluidity results in favorable moldability for injection molding of precision components and thin-walled products.

In addition, in the high molecular weight polycarbonate resin of the present invention, the value of N (structural viscosity index) as represented with the following equation (I) is preferably 1.30 or less, more preferably 1.28 or less and particularly preferably 1.25 or less.

$$N \text{ value} = (\log(Q160 \text{ value}) - \log(Q10 \text{ value}))/(\log 160 - \log 10) \quad (I)$$

In the aforementioned equation (I), the Q160 value represents melt flow volume per unit time (ml/sec) measured at 280° C. and load of 160 kg (measured using the Model CFT-500 manufactured by Shimadzu Corp. (to apply similarly hereinafter) and calculated based on a stroke of 7.0 mm to 10.0 mm), while the Q10 value represents melt flow volume per unit time (ml/sec) measured at 280° C. and load of 10 kg (and calculated based on a stroke of 7.0 mm to 10.0 mm) (nozzle diameter of 1 mm×nozzle length of 10 mm).

Structural viscosity index (N value) is considered to be an indicator of the degree of branching of an aromatic polycarbonate resin. The polycarbonate copolymer of the present invention has a low N value, a low content ratio of branching structures and a high ratio of linear structures. Although polycarbonate resins generally tend to have higher fluidity (higher Q values) even if the proportion of branching structures is increased for the same molecular weight (Mw), the high molecular weight polycarbonate resin obtained with the continuous production method of the present invention achieves high fluidity (high Q value) while maintaining a low N value.

According to the present invention, since a prepolymer mixture can be obtained while inhibiting volatilization even when using an aliphatic diol compound having a comparatively low boiling point as well as inhibiting decreases in molecular weight of an aromatic polycarbonate prepolymer, by adding an aliphatic diol compound to an aromatic polycarbonate prepolymer at a pressure exceeding 200 torr, followed by supplying the prepolymer mixture to a linking and highly polymerizing reaction under a reduced pressure condition in step (C) before the terminal hydroxyl group concentration of the aromatic polycarbonate prepolymer in the prepolymer mixture reaches 2000 ppm, a highly polymerizing is achieved efficiently and without causing a decrease in addition rate (immobilization rate), and a high-quality, high molecular weight polycarbonate resin can be obtained having a low N value, favorable color tone and little structural heterogeneity.

EXAMPLES

The following provides a more detailed explanation of the present invention through examples thereof, but the present invention is not subjected to any limitations by the examples.

Furthermore, physical properties were measured in the manner described below.

(1) Weight average molecular weight: Weight average molecular weight was measured by gel permeation chromatography (GPC), and is indicated in terms of polystyrene standard as determined from a standard curve of polystyrene standards prepared in advance.

Weight average molecular weight (Mw) in terms of polystyrene standard: A standard curve was prepared using polystyrene standards having a known molecular weight (molecular weight distribution=1) by GPC using chloroform for the developing solvent. Each peak elution time and molecular weight value was plotted from the measured polystyrene standards, and the results were approximated with a cubic equation to generate a calibration curve. Weight average molecular weight (Mw) was determined using the following calculation formula.

[Calculation Formula]

$$Mw = \Sigma P_1 \div \Sigma P_0$$

Here, $P_0$ represents "signal intensity of an RI detector", and $P_1$ represents "signal intensity of an RI detector×molecular weight". In addition, molecular weight represents polystyrene molecular weight value at the same elution time on the calibration curve.

[Measurement Conditions]

Apparatus: HLC-8320GPC, Tosoh Corp.

Columns: Guard column: TSK Guard Column Super MPHZ-M×1

Analytical column: TSK Gel Super Multipore HZ-M×3

Solvent: HPLC-grade chloroform

Injection volume: 10 μL

Sample concentration: 0.2 w/v % HPLC-grade chloroform solution

Solvent flow rate: 0.35 ml/min

Measuring temperature: 40° C.

Detector: RI (2) No. of terminal phenyl groups and terminal phenyl group concentration: 0.05 g of resin sample were dissolved in 1 ml of deuterochloroform (containing 0.05 w/v % TMS), followed by measuring the number of terminal phenyl groups of the prepolymer (PP) using a nuclear magnetic resonance apparatus ($^1$H-NMR) at 23° C.

[Measurement Conditions]

Apparatus: LA-500 (500 MHz), JEOL Co., Ltd.

Measured nucleus: $^1$H

Relaxation delay: 1 s x angle: 45 degrees x 90 width: 20 μs x plus: 10 μs

Scan: 500 times

[Calculation]

The number of terminal phenyl groups and terminal phenyl group concentration were determined from the integral ratio between terminal phenyl groups at about 7.4 ppm and phenylene groups in the vicinity of 7.0 ppm to 7.3 ppm (derived from BPA skeleton).

(3) Terminal Hydroxyl Group Concentration:

0.05 g of resin sample were dissolved in 1 ml of deuterochloroform (containing 0.05 w/v % TMS), and the terminal hydroxyl group concentrations (OH concentrations) in the prepolymer (PP) and highly polymerized polycarbonate resin (PC) were measured using a nuclear magnetic resonance apparatus ($^1$H-NMR) at 23° C.

[Measurement Conditions]

Apparatus: LA-500 (500 MHz), JEOL Co., Ltd.

Measured nucleus: $^1$H

Relaxation delay: 1 s x angle: 45 degrees x 90 width: 20 μs
x plus: 10 μs
Scan: 500 times
[Calculation]

Terminal hydroxyl group concentrations (OH concentrations) in PP and the highly polymerized PC were calculated from the integral ratio between a hydroxyl group peak at 4.7 ppm and phenyl and phenylene groups in the vicinity of 7.0 ppm to 7.5 ppm (terminal phenyl groups and phenylene groups derived from BPA skeleton).

(4) N Value: N Value was Calculated from the Following Equation (I).

[Equation 1]

$$N \text{ value} = (\log(Q160 \text{ value}) - \log(Q10 \text{ value}))/(\log 160 - \log 10) \quad (I)$$

The Q160 value is the melt flow volume per unit time (ml/sec) measured at 280° C. and load of 160 kg, and was measured using the Model CFT-500D manufactured by Shimadzu Corp., and calculated based on a stroke of 7.0 mm to 10.0 mm using a nozzle diameter of 1 mm×nozzle length of 10 mm.

The Q10 value is the melt flow volume per unit time (ml/sec) measured at 280° C. and load of 10 kgm, and was measured using the Model CFT-500D manufactured by Shimadzu Corp., and calculated based on a stroke of 7.0 mm to 10.0 mm using a nozzle diameter of 1 mm×nozzle length of 10 mm.

(5) YI value (Yellow Index): The YI value refers to the degree to which hue moves away from colorlessness or whiteness in the direction of yellow. 6 g of resin sample were dissolved in 60 ml of methylene chloride to obtain a liquid followed by measuring in compliance with JIS K7105 using a spectral color difference meter (SE2000, Nippon Denshoku Industries Co., Ltd.).

Example 1

A polycarbonate resin was produced under the following conditions with the continuous production apparatus shown in FIG. 1 having two primary raw material preparation tanks (1Ra, 1Rb), two linking agent preparation tanks (2Ra, 2Rb), four vertical stirred reaction vessels (3R to 6R) and one horizontal stirred reaction vessel (7R).

First, each reaction vessel and preheater was preliminarily set to an internal temperature and pressure corresponding to the reaction conditions indicated in Table 1.

A melt mixture prepared by suitably mixing diphenyl carbonate and bisphenol A (BPA) so that the raw material molar ratio (diphenyl carbonate/BPA) in the primary raw material preparation tanks 1Ra and 1Rb was 1.12 was continuously supplied to the first vertical stirred reaction vessel 3R (reaction conditions: 100 torr (13 kPa), 180° C., stirring speed: 160 rpm, volume: 130 L) in a nitrogen gas atmosphere at a flow rate of 46.8 kg/hr, and the liquid level was maintained at a constant level while controlling the opening of a valve provided in a polymer discharge line in the bottom of the reaction vessel so that the average retention time in the first vertical stirred reaction vessel 3R was 60 minutes. At this time, a 0.2 w/v % aqueous sodium bicarbonate (NaHCO$_3$) solution was added as catalyst from the catalyst feed port 1Cat at a ratio of 1.0 μmol to 1 mole of BPA (4.2 ml/hr).

Polymerization reaction solution discharged from the bottom of the first vertical stirred reaction vessel 3R was then continuously supplied to the second vertical stirred reaction vessel 4R, the third vertical stirred reaction vessel 5R, the fourth vertical stirred reaction vessel 6R and finally the kneader 6Mix.

Prepolymer (which may also be abbreviated as "PP") was supplied to the kneader 6Mix at a flow rate of 25736 g/hr simultaneous to an aliphatic diol compound (1,4-cyclohexane dimethanol: CHDM) being continuously supplied thereto from the linking agent preparation tanks (2Ra, 2Rb) with a quantitative pump at a flow rate of 264 g/hr (0.25 moles to 1 mole of all terminal groups (end-capped terminal phenyl groups) of the PP).

The weight average molecular weight (Mw) of the PP in terms of polystyrene standard continuously supplied to the kneader 6Mix was 20000, the terminal phenyl group concentration was 7.3 mol %, and the terminal hydroxyl group concentration was 500 ppm.

The amount of time from addition of the aliphatic diol compound to supplying to the linking and highly polymerizing reaction (transesterification) reaction under a reduced pressure condition was 3 minutes.

The PP mixture was supplied from the kneader 6Mix to the fifth horizontal stirred reaction vessel 7R at a flow rate of 26000 g/hr. The pressure inside the fifth horizontal stirred reaction vessel 7R at this time was a reduced pressure of 0.5 torr.

Furthermore, the aliphatic diol compound had been subjected to heating and melting (150° C.) and dehydration treatment (moisture content: 0.3%) in the linking agent preparation tanks, and the melt viscosity thereof when continuously supplied to the kneader 6Mix was 40 poise.

During the polymerization reaction (highly polymerization reaction), the liquid level was controlled so that the average retention time in each vertical stirred reaction vessel was 60 minutes and the average retention time in the fifth horizontal stirred reaction vessel 7R was 30 minutes, and phenol formed as a by-product simultaneous to the polymerization reaction was distilled off. The impeller 7Y of the fifth horizontal stirred reaction vessel 7R was rotated at 20 rpm.

The terminal hydroxyl group concentration of the prepolymer mixture obtained after mixing in the kneader 6Mix was 1500 ppm and the weight average molecular weight was 15000.

The weight average molecular weight (Mw) of the polycarbonate resin in terms of polystyrene standard obtained after carrying out the linking and highly polymerizing reaction in the fifth horizontal stirred reaction vessel 7R was 63000, and the increase in Mw per minute of retention time during the time from addition of the aliphatic diol compound until completion of the linking and highly polymerizing reaction in the fifth horizontal stirred reaction vessel 7R was 1303. In addition, the N value of the resulting polycarbonate resin was 1.22, the terminal hydroxyl group concentration was 280 ppm, and the YI value was 1.1.

The reaction vessels used in Example 1 were as indicated below.

First to Fourth Vertical Stirred Reaction Vessels:
Manufacturer: Sumitomo Heavy Industries, Ltd.
Material: SUS316L electrolytic polished stainless steel
Impellers:
Maxblend impeller for First to third vertical stirred reaction vessels
Double helical ribbon impeller for Fourth vertical stirred reaction vessel
Kneader (inline mixer):
SIKRC Reactor, Kurimoto, Ltd. (kneader type A in Table 1)
Size: D=25 mm×255 mm (L/D=10.2)

Diol Feed Pump:
Continuous non-pulsating quantitative pump, Fuji Techno Industries Corp.
Feed Lines:
Double-walled, warmed (mechanical seals)
Fifth Horizontal Stirred Reaction Vessel:
Manufacturer: Hitachi Ltd.
Machine Type: Spectacle-shaped blade polymerizer 34L
Material: SUS316L electrolytic polished stainless steel
Extractor: Screw-type extractor
Internal Oxygen Concentration Adjustment: Pressurized devolatilization and replacement with nitrogen
Furthermore, the retention time of the reaction mixture is the average retention time of the reaction mixture from the aromatic polycarbonate prepolymer feed port of the horizontal stirred reaction vessel to the outlet of the high molecular weight polycarbonate resin produced.

In the present example, after preliminarily filling 13000 g of the prepolymer (PP) mixture into the fifth horizontal stirred reaction vessel prior to starting continuous production, retention time was measured and confirmed with a tracer after having maintained the liquid level at a constant level and set the flow rates of the gear pump 6P and the screw-type extractor 7P to 26000 g/hr based on the condition of the PP mixture remaining in the reaction vessel for 30 minutes.

Example 2

A polycarbonate resin was produced under the following conditions with the continuous production apparatus shown in FIG. 1 having two primary raw material preparation tanks, two linking agent preparation tanks, four vertical stirred reaction vessels and one horizontal stirred reaction vessel.

First, each reaction vessel and preheater was preliminarily set to an internal temperature and pressure corresponding to the reaction conditions indicated in Table 1.

A melt mixture prepared by suitably mixing diphenyl carbonate and bisphenol A (BPA) so that the raw material molar ratio (diphenyl carbonate/BPA) in the primary raw material preparation tanks 1Ra and 1Rb was 1.15 was continuously supplied to the first vertical stirred reaction vessel 3R (reaction conditions: 100 torr (13 kPa), 180° C., stirring speed: 160 rpm, volume: 130 L) in a nitrogen gas atmosphere at a flow rate of 46.9 kg/hr, and the liquid level was maintained at a constant level while controlling the opening of a valve provided in a polymer discharge line in the bottom of the reaction vessel so that the average retention time in the first vertical stirred reaction vessel 3R was 60 minutes. At this time, a 0.2 w/v % aqueous cesium carbonate ($Cs_2CO_3$) solution was added as catalyst from the catalyst feed port 1Cat at a ratio of 0.5 moles to 1 mole of BPA (8.2 ml/hr).

Polymerization reaction solution discharged from the bottom of the first vertical stirred reaction vessel 3R was then continuously supplied to the second vertical stirred reaction vessel 4R, the third vertical stirred reaction vessel 5R, the fourth vertical stirred reaction vessel 6R and finally the kneader 6Mix.

Prepolymer (which may also be abbreviated as "PP") was supplied to the kneader 6Mix at a flow rate of 25801 g/hr simultaneous to an aliphatic diol compound (1,4-cyclohexane dimethanol: CHDM) being continuously supplied thereto from the linking agent preparation tanks (2Ra, 2Rb) with a quantitative pump at a flow rate of 199 g/hr (0.25 moles to 1 mole of all terminal groups (end-capped terminal phenyl groups) of the PP).

The weight average molecular weight (Mw) of the PP in terms of polystyrene standard continuously supplied to the kneader 6Mix was 30000, the terminal phenyl group concentration was 5.5 mol %, and the terminal hydroxyl group concentration was 80 ppm.

The amount of time from addition of the aliphatic diol compound to supplying to the transesterification reaction under a reduced pressure condition was 3 minutes.

The PP mixture was supplied from the kneader 6Mix to the fifth horizontal stirred reaction vessel 7R at a flow rate of 26000 g/hr. The pressure inside the fifth horizontal stirred reaction vessel 7R at this time was a reduced pressure of 0.5 torr.

Furthermore, the aliphatic diol compound had been subjected to heating and melting (150° C.) and dehydration treatment (moisture content: 0.3%) in the linking agent preparation tanks, and the melt viscosity thereof when continuously supplied to the kneader 6Mix was 40 poise.

During the polymerization reaction (highly polymerization reaction), the liquid level was controlled so that the average retention time in each vertical stirred reaction vessel was 60 minutes and the average retention time in the fifth horizontal stirred reaction vessel 7R was 30 minutes, and phenol formed as a by-product simultaneous to the polymerization reaction was distilled off. The impeller 7Y of the fifth horizontal stirred reaction vessel 7R was rotated at 20 rpm.

The terminal hydroxyl group concentration of the prepolymer mixture obtained after mixing in the kneader 6Mix was 700 ppm and the weight average molecular weight was 22000.

The weight average molecular weight (Mw) of the polycarbonate resin in terms of polystyrene standard obtained after carrying out the linking and highly polymerizing reaction in the fifth horizontal stirred reaction vessel 7R was 61000, and the increase in Mw per minute of retention time during the time from addition of the aliphatic diol compound until completion of the linking and highly polymerizing reaction in the fifth horizontal stirred reaction vessel 7R was 939. In addition, the N value of the resulting polycarbonate resin was 1.22, the terminal hydroxyl group concentration was 430 ppm, and the YI value was 1.2.

The reaction vessels used in Example 2 were as indicated below.
First to Fourth Vertical Stirred Reaction Vessels:
Manufacturer: Sumitomo Heavy Industries, Ltd.
Material: SUS316L electrolytic polished stainless steel
Impellers:
Maxblend impeller for First to third vertical stirred reaction vessels
Double helical ribbon impeller for Fourth vertical stirred reaction vessel
Kneader (inline mixer):
SIKRC Reactor, Kurimoto, Ltd. (kneader type A in Table 1)
Size: D=25 mm×255 mm (L/D=10.2)
Diol Feed Pump:
Continuous non-pulsating quantitative pump, Fuji Techno Industries Corp.
Feed Lines:
Double-walled, warmed (mechanical seals)
Fifth Horizontal Stirred Reaction Vessel:
Manufacturer: Hitachi Ltd.
Machine Type: Spectacle-shaped blade polymerizer 34L
Material: SUS316L electrolytic polished stainless steel
Extractor: Screw-type extractor
Internal Oxygen Concentration Adjustment: Pressurized devolatilization and replacement with nitrogen
Furthermore, the retention time of the reaction mixture is the average retention time of the reaction mixture from the aromatic polycarbonate prepolymer feed port of the horizontal stirred reaction vessel to the outlet of the high molecular weight polycarbonate resin produced.

In the present example, after preliminarily filling 13000 g of the prepolymer (PP) mixture into the fifth horizontal stirred reaction vessel prior to starting continuous production, retention time was measured and confirmed with a tracer after having maintained the liquid level at a constant level and set the flow rates of the gear pump 6P and the screw-type extractor 7P to 26000 g/hr based on the condition of the PP mixture remaining in the reaction vessel for 30 minutes.

Example 3

A polycarbonate resin was produced under the following conditions with the continuous production apparatus shown in FIG. 1 having two primary raw material preparation tanks, two linking agent preparation tanks, four vertical stirred reaction vessels and one horizontal stirred reaction vessel.

First, each reaction vessel and preheater was preliminarily set to an internal temperature and pressure corresponding to the reaction conditions indicated in Table 1.

A melt mixture prepared by suitably mixing diphenyl carbonate and bisphenol A (BPA) so that the raw material molar ratio (diphenyl carbonate/BPA) in the primary raw material preparation tanks 1Ra and 1Rb was 1.12 was continuously supplied to the first vertical stirred reaction vessel 3R (reaction conditions: 100 torr (13 kPa), 180° C., stirring speed: 160 rpm, volume: 130 L) in a nitrogen gas atmosphere at a flow rate of 46.6 kg/hr, and the liquid level was maintained at a constant level while controlling the opening of a valve provided in a polymer discharge line in the bottom of the reaction vessel so that the average retention time in the first vertical stirred reaction vessel 3R was 60 minutes. At this time, a 0.2 w/v % aqueous sodium bicarbonate (NaHCO$_3$) solution was added as catalyst from the catalyst feed port 1Cat at a ratio of 1.0 μmol to 1 mole of BPA (4.2 ml/hr).

Polymerization reaction solution discharged from the bottom of the first vertical stirred reaction vessel 3R was then continuously supplied to the second vertical stirred reaction vessel 4R, the third vertical stirred reaction vessel 5R, the fourth vertical stirred reaction vessel 6R and finally the kneader 6Mix.

Prepolymer (which may also be abbreviated as "PP") was supplied to the kneader 6Mix at a flow rate of 25639 g/hr simultaneous to an aliphatic diol compound (decalin dimethanol: DDM) being continuously supplied thereto from the linking agent preparation tanks (2Ra, 2Rb) with a quantitative pump at a flow rate of 361 g/hr (0.25 moles to 1 mole of all terminal groups (end-capped terminal phenyl groups) of the PP).

The weight average molecular weight (Mw) of the PP in terms of polystyrene standard continuously supplied to the kneader 6Mix was 20000, the terminal phenyl group concentration was 7.3 mol %, and the terminal hydroxyl group concentration was 500 ppm.

The amount of time from addition of the aliphatic diol compound to supplying to the transesterification reaction under a reduced pressure condition was 3 minutes.

The PP mixture was supplied from the kneader 6Mix to the fifth horizontal stirred reaction vessel 7R at a flow rate of 26000 g/hr. The pressure inside the fifth horizontal stirred reaction vessel 7R at this time was a reduced pressure of 0.5 torr.

Furthermore, the aliphatic diol compound had been subjected to heating and melting (160° C.) and dehydration treatment (moisture content: 0.3%) in the linking agent preparation tanks, and the melt viscosity thereof when continuously supplied to the kneader 6Mix was 40 poise.

During the polymerization reaction (highly polymerization reaction), the liquid level was controlled so that the average retention time in each vertical stirred reaction vessel was 60 minutes and the average retention time in the fifth horizontal stirred reaction vessel 7R was 30 minutes, and phenol formed as a by-product simultaneous to the polymerization reaction was distilled off. The impeller 7Y of the fifth horizontal stirred reaction vessel 7R was rotated at 20 rpm.

The terminal hydroxyl group concentration of the prepolymer mixture obtained after mixing in the kneader 6Mix was 1200 ppm and the weight average molecular weight was 15000.

The weight average molecular weight (Mw) of the polycarbonate resin in terms of polystyrene standard obtained after carrying out the linking and highly polymerizing reaction in the fifth horizontal stirred reaction vessel 7R was 55000, and the increase in Mw per minute of retention time during the time from addition of the aliphatic diol compound until completion of the linking and highly polymerizing reaction in the fifth horizontal stirred reaction vessel 7R was 1061. In addition, the N value of the resulting polycarbonate resin was 1.22, the terminal hydroxyl group concentration was 510 ppm, and the YI value was 1.2.

The reaction vessels used in Example 3 were as indicated below.

First to Fourth Vertical Stirred Reaction Vessels:
Manufacturer: Sumitomo Heavy Industries, Ltd.
Material: SUS316L electrolytic polished stainless steel
Impellers:
Maxblend impeller for First to third vertical stirred reaction vessels
Double helical ribbon impeller for Fourth vertical stirred reaction vessel
Kneader (inline mixer):
SIKRC Reactor, Kurimoto, Ltd. (kneader type A in Table 1)
Size: D=25 mm×255 mm (L/D=10.2)
Diol Feed Pump:
Continuous non-pulsating quantitative pump, Fuji Techno Industries Corp.
Feed Lines:
Double-walled, warmed (mechanical seals)
Fifth Horizontal Stirred Reaction Vessel:
Manufacturer: Hitachi Ltd.
Machine Type Spectacle-shaped blade polymerizer 34L
Material: SUS316L electrolytic polished stainless steel
Extractor: Screw-type extractor
Internal Oxygen Concentration Adjustment: Pressurized devolatilization and replacement with nitrogen The retention time of the reaction mixture is the average retention time of the reaction mixture from the aromatic polycarbonate prepolymer feed port of the horizontal stirred reaction vessel to the outlet of the high molecular weight polycarbonate resin produced.

In the present example, after preliminarily filling 13000 g of the prepolymer (PP) mixture into the fifth horizontal stirred reaction vessel prior to starting continuous production, retention time was measured and confirmed with a tracer after having maintained the liquid level at a constant level and set the flow rates of the gear pump 6P and the screw-type extractor 7P to 26000 g/hr based on the condition of the PP mixture remaining in the reaction vessel for 30 minutes.

Example 4

A polycarbonate resin was produced under the following conditions with the continuous production apparatus shown in FIG. 1 having two primary raw material preparation tanks, two linking agent preparation tanks, four vertical stirred reaction vessels and one horizontal stirred reaction vessel.

First, each reaction vessel and preheater was preliminarily set to an internal temperature and pressure corresponding to the reaction conditions indicated in Table 1.

A melt mixture prepared by suitably mixing diphenyl carbonate and bisphenol A (BPA) so that the raw material molar ratio (diphenyl carbonate/BPA) in the primary raw material preparation tanks 1Ra and 1Rb was 1.15 was continuously supplied to the first vertical stirred reaction vessel 3R (reaction conditions: 100 torr (13 kPa), 180° C., stirring speed: 160 rpm, volume: 130 L) in a nitrogen gas atmosphere at a flow rate of 46.9 kg/hr, and the liquid level was maintained at a constant level while controlling the opening of a valve provided in a polymer discharge line in the bottom of the reaction vessel so that the average retention time in the first vertical stirred reaction vessel 3R was 60 minutes. At this time, a 0.2 w/v % aqueous cesium carbonate ($Cs_2CO_3$) solution was added as catalyst from the catalyst feed port 1Cat at a ratio of 0.5 µmoles to 1 mole of BPA (8.2 ml/hr).

Polymerization reaction solution discharged from the bottom of the first vertical stirred reaction vessel 3R was then continuously supplied to the second vertical stirred reaction vessel 4R, the third vertical stirred reaction vessel 5R, the fourth vertical stirred reaction vessel 6R and finally the kneader 6Mix.

Prepolymer (which may also be abbreviated as "PP") was supplied to the kneader 6Mix at a flow rate of 25801 g/hr simultaneous to an aliphatic diol compound (2-ethyl-2-butyl-1,3-propylene glycol: BEPG) being continuously supplied thereto from the linking agent preparation tanks (2Ra, 2Rb) with a quantitative pump at a flow rate of 220 g/hr (0.25 moles to 1 mole of all terminal groups of the PP).

The weight average molecular weight (Mw) of the PP in terms of polystyrene standard continuously supplied to the kneader 6Mix was 30000, the terminal phenyl group concentration was 5.5 mol %, and the terminal hydroxyl group concentration was 80 ppm.

The amount of time from addition of the aliphatic diol compound to supplying to the transesterification reaction under a reduced pressure condition was 3 minutes.

The PP mixture was supplied from the kneader 6Mix to the fifth horizontal stirred reaction vessel 7R at a flow rate of 26000 g/hr. The pressure inside the fifth horizontal stirred reaction vessel 7R at this time was a reduced pressure of 0.5 torr.

Furthermore, the aliphatic diol compound had been subjected to heating and melting (150° C.) and dehydration treatment (moisture content: 0.3%) in the linking agent preparation tanks, and the melt viscosity thereof when continuously supplied to the kneader 6Mix was 40 poise.

During the polymerization reaction (highly polymerization reaction), the liquid level was controlled so that the average retention time in each vertical stirred reaction vessel was 60 minutes and the average retention time in the fifth horizontal stirred reaction vessel 7R was 30 minutes, and phenol formed as a by-product simultaneous to the polymerization reaction was distilled off. The impeller 7Y of the fifth horizontal stirred reaction vessel 7R was rotated at 20 rpm.

The terminal hydroxyl group concentration of the prepolymer mixture obtained after mixing in the kneader 6Mix was 700 ppm and the weight average molecular weight was 22000.

The weight average molecular weight (Mw) of the polycarbonate resin in terms of polystyrene standard obtained after carrying out the linking and highly polymerizing reaction in the fifth horizontal stirred reaction vessel 7R was 57000, and the increase in Mw per minute of retention time during the time from addition of the aliphatic diol compound until completion of the linking and highly polymerizing reaction in the fifth horizontal stirred reaction vessel 7R was 818. In addition, the N value of the resulting polycarbonate resin was 1.22, the terminal hydroxyl group concentration was 430 ppm, and the YI value was 1.1.

The reaction vessels used in Example 4 were as indicated below.

First to Fourth Vertical Stirred Reaction Vessels:
Manufacturer: Sumitomo Heavy Industries, Ltd.
Material: SUS316L electrolytic polished stainless steel
Impellers:
Maxblend impeller for First to third vertical stirred reaction vessels
Double helical ribbon impeller for Fourth vertical stirred reaction vessel
Kneader (inline mixer):
SIKRC Reactor, Kurimoto, Ltd.
Size: D=25 mm×255 mm (L/D=10.2)
Diol Feed Pump:
Continuous non-pulsating quantitative pump, Fuji Techno Industries Corp.
Feed Lines:
Double-walled, warmed (mechanical seals)
Fifth Horizontal Stirred Reaction Vessel:
Manufacturer: Hitachi Ltd.
Machine Type Spectacle-shaped blade polymerizer 34L
Material: SUS316L electrolytic polished stainless steel
Extractor: Screw-type extractor
Internal Oxygen Concentration Adjustment: Pressurized devolatilization and replacement with nitrogen Furthermore, the retention time of the reaction mixture is the average retention time of the reaction mixture from the aromatic polycarbonate prepolymer feed port of the horizontal stirred reaction vessel to the outlet of the high molecular weight polycarbonate resin produced.

In the present example, after preliminarily filling 13000 g of the prepolymer (PP) mixture into the fifth horizontal stirred reaction vessel prior to starting continuous production, retention time was measured and confirmed with a tracer after having maintained the liquid level at a constant level and set the flow rates of the gear pump 6P and the screw-type extractor 7P to 26000 g/hr based on the condition of the PP mixture remaining in the reaction vessel for 30 minutes.

Comparative Example 1

A polycarbonate resin was produced under the following conditions with the continuous production apparatus shown in FIG. 1 having two primary raw material preparation tanks, two linking agent preparation tanks, four vertical stirred reaction vessels and one horizontal stirred reaction vessel.

First, each reaction vessel and preheater was preliminarily set to an internal temperature and pressure corresponding to the reaction conditions indicated in Table 1.

A melt mixture prepared by suitably mixing diphenyl carbonate and bisphenol A (BPA) so that the raw material molar ratio (diphenyl carbonate/BPA) in the primary raw material preparation tanks 1Ra and 1Rb was 1.12 was continuously supplied to the first vertical stirred reaction vessel 3R (reaction conditions: 100 torr (13 kPa), 180° C., stirring speed: 160 rpm, volume: 130 L) in a nitrogen gas atmosphere at a flow rate of 46.8 kg/hr, and the liquid level was maintained at a constant level while controlling the opening of a valve provided in a polymer discharge line in the bottom of the reaction vessel so that the average retention time in the first vertical stirred reaction vessel 3R was 60 minutes. At this time, a 0.2 w/v % aqueous cesium carbonate ($Cs_2CO_3$) solution was added as catalyst from the catalyst feed port 1Cat at a ratio of 0.5 µmoles to 1 mole of BPA (8.1 ml/hr).

Polymerization reaction solution discharged from the bottom of the first vertical stirred reaction vessel 3R was then continuously supplied to the second vertical stirred reaction vessel 4R, the third vertical stirred reaction vessel 5R, the fourth vertical stirred reaction vessel 6R and finally the kneader 6Mix.

Prepolymer (which may also be abbreviated as "PP") was supplied to the kneader 6Mix at a flow rate of 25736 g/hr simultaneous to an aliphatic diol compound (1,4-cyclohexane dimethanol: CHDM) being continuously supplied thereto from the linking agent preparation tanks (2Ra, 2Rb) with a quantitative pump at a flow rate of 264 g/hr (0.25 moles to 1 mole of all terminal groups (end-capped terminal phenyl groups) of the PP).

The weight average molecular weight (Mw) of the PP in terms of polystyrene standard continuously supplied to the kneader 6Mix was 20000, the terminal phenyl group concentration was 7.3 mol %, and the terminal hydroxyl group concentration was 500 ppm.

The amount of time from addition of the aliphatic diol compound to supplying to the transesterification reaction under a reduced pressure condition was 8 minutes.

The PP mixture was supplied from the kneader 6Mix to the fifth horizontal stirred reaction vessel 7R at a flow rate of 26000 g/hr. The pressure inside the fifth horizontal stirred reaction vessel 7R at this time was a reduced pressure of 0.5 torr.

Furthermore, the aliphatic diol compound had been subjected to heating and melting (150° C.) and dehydration treatment (moisture content: 0.3%) in the linking agent preparation tanks, and the melt viscosity thereof when continuously supplied to the kneader 6Mix was 40 poise.

During the polymerization reaction (highly polymerization reaction), the liquid level was controlled so that the average retention time in each vertical stirred reaction vessel was 60 minutes and the average retention time in the fifth horizontal stirred reaction vessel 7R was 30 minutes, and phenol formed as a by-product simultaneous to the polymerization reaction was distilled off. The impeller 7Y of the fifth horizontal stirred reaction vessel 7R was rotated at 20 rpm.

The terminal hydroxyl group concentration of the prepolymer mixture obtained after mixing in the kneader 6Mix was 2100 ppm and the weight average molecular weight was 11000.

The weight average molecular weight (Mw) of the polycarbonate resin in terms of polystyrene standard obtained after carrying out the linking and highly polymerizing reaction in the fifth horizontal stirred reaction vessel 7R was 33000, and the increase in Mw per minute of retention time during the time from addition of the aliphatic diol compound until completion of the linking and highly polymerizing reaction in the fifth horizontal stirred reaction vessel 7R was 342. In addition, the N value of the resulting polycarbonate resin was 1.22, the terminal hydroxyl group concentration was 1300 ppm, and the YI value was 1.2.

The reaction vessels used in Comparative Example 1 were as indicated below.

First to Fourth Vertical Stirred Reaction Vessels:
Manufacturer: Sumitomo Heavy Industries, Ltd.
Material: SUS316L electrolytic polished stainless steel
Impellers:
Maxblend impeller for First to third vertical stirred reaction vessels
Double helical ribbon impeller for Fourth vertical stirred reaction vessel
Kneader (inline mixer):
SIIKRC Reactor, Kurimoto, Ltd. (kneader type B in Table 1)
Size: D=50 mm×661.5 mm (L/D=13.2)
Diol Feed Pump:
Continuous non-pulsating quantitative pump, Fuji Techno Industries Corp.
Feed Lines:
Double-walled, warmed (mechanical seals)
Fifth Horizontal Stirred Reaction Vessel:
Manufacturer: Hitachi Ltd.
Machine Type Spectacle-shaped blade polymerizer 34L
Material: SUS316L electrolytic polished stainless steel
Extractor: Screw-type extractor
Internal Oxygen Concentration Adjustment: Pressurized devolatilization and replacement with nitrogen Furthermore, the retention time of the reaction mixture is the average retention time of the reaction mixture from the aromatic polycarbonate prepolymer feed port of the horizontal stirred reaction vessel to the outlet of the high molecular weight polycarbonate resin produced.

In the present comparative example, after preliminarily filling 13000 g of the prepolymer (PP) mixture into the fifth horizontal stirred reaction vessel prior to starting continuous production, retention time was measured and confirmed with a tracer after having maintained the liquid level at a constant level and set the flow rates of the gear pump 6P and the screw-type extractor 7P to 26000 g/hr based on the condition of the PP mixture remaining in the reaction vessel for 30 minutes.

Comparative Example 2

A polycarbonate resin was produced under the following conditions with the continuous production apparatus shown in FIG. 1 having two primary raw material preparation tanks (1Ra, 2Ra), two linking agent preparation tanks (2Ra, 2Rb), four vertical stirred reaction vessels (3R to 6R) and one horizontal stirred reaction vessel (7R).

First, each reaction vessel and preheater was preliminarily set to an internal temperature and pressure corresponding to the reaction conditions indicated in Table 1.

A melt mixture prepared by suitably mixing diphenyl carbonate and bisphenol A (BPA) so that the raw material molar ratio (diphenyl carbonate/BPA) in the primary raw material preparation tanks 1Ra and 1Rb was 1.12 was continuously supplied to the first vertical stirred reaction vessel 3R (reaction conditions: 100 torr (13 kPa), 180° C., stirring speed: 160 rpm, volume: 130 L) in a nitrogen gas atmosphere at a flow rate of 15.6 kg/hr, and the liquid level was maintained at a constant level while controlling the opening of a valve provided in a polymer discharge line in the bottom of the reaction vessel 3R so that the average retention time in the first vertical stirred reaction vessel 3R was 60 minutes. At this time, a 0.2 w/v % aqueous sodium bicarbonate ($NaHCO_3$) solution was added as catalyst from the catalyst feed port 1Cat at a ratio of 1.0 µmol to 1 mole of BPA (1.4 ml/hr).

Polymerization reaction solution discharged from the bottom of the first vertical stirred reaction vessel 3R was then continuously supplied to the second vertical stirred reaction vessel 4R, the third vertical stirred reaction vessel 5R, the fourth vertical stirred reaction vessel 6R and finally the kneader 6Mix.

Prepolymer (which may also be abbreviated as "PP") was supplied to the kneader 6Mix at a flow rate of 8579 g/hr simultaneous to an aliphatic diol compound (1,4-cyclohexane dimethanol: CHDM) being continuously supplied thereto from the linking agent preparation tanks (2Ra, 2Rb) with a quantitative pump at a flow rate of 88 g/hr (0.25 moles to 1 mole of all terminal groups of the PP).

The weight average molecular weight (Mw) of the PP in terms of polystyrene standard continuously supplied to the kneader 6Mix was 20000, the terminal phenyl group concentration was 7.3 mol %, and the terminal hydroxyl group concentration was 500 ppm.

The amount of time from addition of the aliphatic diol compound to supplying to the linking and highly polymerizing reaction (transesterification reaction) reaction under a reduced pressure condition was 8 minutes.

The PP mixture was supplied from the kneader 6Mix to the fifth horizontal stirred reaction vessel 7R at a flow rate of 8667 g/hr. The pressure inside the fifth horizontal stirred reaction vessel 7R at this time was a reduced pressure of 0.5 torr.

Furthermore, the aliphatic diol compound had been subjected to heating and melting (150° C.) and dehydration treatment (moisture content: 0.3%) in the linking agent preparation tanks, and the melt viscosity thereof when continuously supplied to the kneader 6Mix was 40 poise.

During the polymerization reaction (highly polymerization reaction), the liquid level was controlled so that the average retention time in each vertical stirred reaction vessel was 60 minutes and the average retention time in the fifth horizontal stirred reaction vessel 7R was 90 minutes, and phenol formed as a by-product simultaneous to the polymerization reaction was distilled off. The impeller 7Y of the fifth horizontal stirred reaction vessel 7R was rotated at 20 rpm.

The terminal hydroxyl group concentration of the prepolymer mixture obtained after mixing in the kneader 6Mix was 2100 ppm and the weight average molecular weight was 11000.

The weight average molecular weight (Mw) of the polycarbonate resin in terms of polystyrene standard obtained after carrying out the linking and highly polymerizing reaction in the fifth horizontal stirred reaction vessel 7R was 60000, and the increase in Mw per minute of retention time during the time from addition of the aliphatic diol compound until completion of the linking and highly polymerizing reaction in the fifth horizontal stirred reaction vessel 7R was 408. In addition, the N value of the resulting polycarbonate resin was 1.31, the terminal hydroxyl group concentration was 800 ppm, and the YI value was 3.0.

The reaction vessels used in Comparative Example 2 were as indicated below.
First to Fourth Vertical Stirred Reaction Vessels:
Manufacturer: Sumitomo Heavy Industries, Ltd.
Material: SUS316L electrolytic polished stainless steel
Impellers:
Maxblend impeller for First to third vertical stirred reaction vessels
Double helical ribbon impeller for Fourth vertical stirred reaction vessel
Kneader (inline mixer):
SIIKRC Reactor, Kurimoto, Ltd. (kneader type B in Table 1)
Size: D=50 mm×661.5 mm (L/D=13.2)

Diol Feed Pump:
Continuous non-pulsating quantitative pump, Fuji Techno Industries Corp.
Feed Lines:
Double-walled, warmed (mechanical seals)
Fifth Horizontal Stirred Reaction Vessel:
Manufacturer: Hitachi Ltd.
Machine Type: Spectacle-shaped blade polymerizer 34L
Material: SUS316L electrolytic polished stainless steel
Extractor: Screw-type extractor
Internal Oxygen Concentration Adjustment: Pressurized devolatilization and replacement with nitrogen Furthermore, the retention time of the reaction mixture is the average retention time of the reaction mixture from the aromatic polycarbonate prepolymer feed port of the horizontal stirred reaction vessel to the outlet of the high molecular weight polycarbonate resin produced.

In the present comparative example, after preliminarily filling 13000 g of the prepolymer (PP) mixture into the fifth horizontal stirred reaction vessel prior to starting continuous production, retention time was measured and confirmed with a tracer after having maintained the liquid level at a constant level and set the flow rates of the gear pump 6P and the screw-type extractor 7P to 8667 g/hr based on the condition of the PP mixture remaining in the reaction vessel for 90 minutes.

Comparative Example 3

A polycarbonate resin was produced under the following conditions with the continuous production apparatus shown in FIG. 1 having two primary raw material preparation tanks (1Ra, 1Rb), two linking agent preparation tanks (2Ra, 2Rb), four vertical stirred reaction vessels (3R to 6R) and one horizontal stirred reaction vessel (7R).

First, each reaction vessel and preheater was preliminarily set to an internal temperature and pressure corresponding to the reaction conditions indicated in Table 1.

A melt mixture prepared by suitably mixing diphenyl carbonate and bisphenol A (BPA) so that the raw material molar ratio (diphenyl carbonate/BPA) in the primary raw material preparation tanks 1Ra and 1Rb was 1.12 was continuously supplied to the first vertical stirred reaction vessel 3R (reaction conditions: 100 torr (13 kPa), 180° C., stirring speed: 160 rpm, volume: 130 L) in a nitrogen gas atmosphere at a flow rate of 46.8 kg/hr, and the liquid level was maintained at a constant level while controlling the opening of a valve provided in a polymer discharge line in the bottom of the reaction vessel so that the average retention time in the first vertical stirred reaction vessel 3R was 60 minutes. At this time, a 0.2 w/v % aqueous sodium bicarbonate ($NaHCO_3$) solution was added as catalyst from the catalyst feed port 1Cat at a ratio of 1.0 µmol to 1 mole of BPA (4.2 ml/hr).

Polymerization reaction solution discharged from the bottom of the first vertical stirred reaction vessel 3R was then continuously supplied to the second vertical stirred reaction vessel 4R, the third vertical stirred reaction vessel 5R, the fourth vertical stirred reaction vessel 6R and finally the kneader 6Mix controlled to an internal pressure of 10 torn Prepolymer (which may also be abbreviated as "PP") was supplied to the kneader 6Mix at a flow rate of 25736 g/hr simultaneous to an aliphatic diol compound (1,4-cyclohexane dimethanol: CHDM) being continuously supplied thereto from the linking agent preparation tanks (2Ra, 2Rb) with a quantitative pump at a flow rate of 264 g/hr (0.25 moles to 1 mole of all terminal groups (end-capped terminal phenyl groups) of the PP).

The weight average molecular weight (Mw) of the PP in terms of polystyrene standard continuously supplied to the kneader 6Mix was 20000, the terminal phenyl group concentration was 7.3 mol %, and the terminal hydroxyl group concentration was 500 ppm.

The amount of time from addition of the aliphatic diol compound to supplying to the linking and highly polymerizing (transesterification) reaction under a reduced pressure condition was 3 minutes.

The PP mixture was supplied from the kneader 6Mix to the fifth horizontal stirred reaction vessel 7R at a flow rate of 26000 g/hr. The pressure inside the fifth horizontal stirred reaction vessel 7R at this time was a reduced pressure of 0.5 torr.

Furthermore, the aliphatic diol compound had been subjected to heating and melting (150° C.) and dehydration treatment (moisture content: 0.3%) in the linking agent preparation tanks, and the melt viscosity thereof when continuously supplied to the kneader 6Mix was 40 poise.

During the polymerization reaction (highly polymerization reaction), the liquid level was controlled so that the average retention time in each vertical stirred reaction vessel was 60 minutes and the average retention time in the fifth horizontal stirred reaction vessel 7R was 30 minutes, and phenol formed as a by-product simultaneous to the polymerization reaction was distilled off. The impeller 7Y of the fifth horizontal stirred reaction vessel 7R was rotated at 20 rpm.

The terminal hydroxyl group concentration of the prepolymer mixture obtained after mixing in the kneader 6Mix was 700 ppm and the weight average molecular weight was 19000.

The weight average molecular weight (Mw) of the polycarbonate resin in terms of polystyrene standard obtained after carrying out the linking and highly polymerizing reaction in the fifth horizontal stirred reaction vessel 7R was 25000, and the increase in Mw per minute of retention time during the time from addition of the aliphatic diol compound until completion of the linking and highly polymerizing reaction in the fifth horizontal stirred reaction vessel 7R was 152. In addition, the N value of the resulting polycarbonate resin was 1.21, the terminal hydroxyl group concentration was 600 ppm, and the YI value was 1.2.

The reaction vessels used in Comparative Example 3 were as indicated below.
First to Fourth Vertical Stirred Reaction Vessels:
Manufacturer: Sumitomo Heavy Industries, Ltd.
Material: SUS316L electrolytic polished stainless steel
Impellers:
Maxblend impeller for First to third vertical stirred reaction vessels
Double helical ribbon impeller for Fourth vertical stirred reaction vessel
Kneader (inline mixer):
SIKRC Reactor, Kurimoto, Ltd. (kneader type A in Table 1)
Size: D=25 mm×255 mm (L/D=10.2)
Diol Feed Pump:
Continuous non-pulsating quantitative pump, Fuji Techno Industries Corp.
Feed Lines:
Double-walled, warmed (mechanical seals)
Fifth Horizontal Stirred Reaction Vessel:
Manufacturer: Hitachi Ltd.
Machine Type Spectacle-shaped blade polymerizer 34L
Material: SUS316L electrolytic polished stainless steel
Extractor: Screw-type extractor
Internal Oxygen Concentration Adjustment: Pressurized devolatilization and replacement with nitrogen Furthermore, the retention time of the reaction mixture is the average retention time of the reaction mixture from the aromatic polycarbonate prepolymer feed port of the horizontal stirred reaction vessel to the outlet of the high molecular weight polycarbonate resin produced.

In the present comparative example, after preliminarily filling 13000 g of the prepolymer (PP) mixture into the fifth horizontal stirred reaction vessel prior to starting continuous production, retention time was measured and confirmed with a tracer after having maintained the liquid level at a constant level and set the flow rates of the gear pump 6P and the screw-type extractor 7P to 26000 g/hr based on the condition of the PP mixture remaining in the reaction vessel for 30 minutes.

TABLE 1

| | | Units | Example 1 | Example 2 | Example 3 | Example 4 | Comparative example 1 | Comparative example 2 | Comparative example 3 |
|---|---|---|---|---|---|---|---|---|---|
| Step (A) | Molecular weight (Mw) of PP obtained in step (A) | — | 20000 | 30000 | 20000 | 30000 | 20000 | 20000 | 20000 |
| | OH concentration of PP obtained in step (A) | ppm | 500 | 80 | 500 | 80 | 500 | 500 | 500 |
| Step (B) Kneader 6Mix | Type of kneader used in step (B) | — | A | A | A | A | B | B | A |
| | Supply rate of PP to step (B) | g/hr | 25736 | 25801 | 25639 | 25780 | 25736 | 8579 | 25736 |
| | Type of aliphatic diol | — | CHDM | CHDM | DDM | BEPG | CHDM | CHDM | CHDM |
| | Amount of aliphatic diol added | Moles(*1) | 0.25 | 0.25 | 0.25 | 0.25 | 0.25 | 0.25 | 0.25 |
| | Addition rate of aliphatic diol to step (B) | g/hr | 264 | 199 | 361 | 220 | 264 | 88 | 264 |
| | Aliphatic diol temperature | ° C. | 150 | 150 | 160 | 150 | 150 | 150 | 150 |
| | Pressure in step (B) | torr(kPa) | 760(101) | 760(101) | 760(101) | 760(101) | 760(101) | 760(101) | 10(1.3) |
| | Temperature in step (B) | ° C. | 275 | 270 | 275 | 270 | 275 | 275 | 275 |
| | Time from addition of aliphatic diol until supplied to transesterification reaction under reduced pressure | min | 3 | 3 | 3 | 3 | 8 | 8 | 3 |

TABLE 1-continued

|  |  | Units | Example 1 | Example 2 | Example 3 | Example 4 | Comparative example 1 | Comparative example 2 | Comparative example 3 |
|---|---|---|---|---|---|---|---|---|---|
| Step (C) 7Y | Molecular weight (Mw) of PP supplied to step (C) | — | 15000 | 22000 | 15000 | 22000 | 11000 | 11000 | 19000 |
|  | OH concentration of PP supplied to step (C) | ppm | 1500 | 700 | 1200 | 700 | 2100 | 2100 | 700 |
|  | Supply rate of mixture of PP and aliphatic diol supplied to step (C) | g/hr | 26000 | 26000 | 26000 | 26000 | 26000 | 8667 | 26000 |
|  | Amount of resin in reaction vessel | g | 13000 | 13000 | 13000 | 13000 | 13000 | 13000 | 13000 |
|  | Internal temperature | °C. | 300 | 300 | 300 | 300 | 300 | 300 | 300 |
|  | Heating medium temperature | °C. | 320 | 320 | 320 | 320 | 320 | 320 | 320 |
|  | Pressure | torr(Pa) | 0.5(67) | 0.5(67) | 0.5(67) | 0.5(67) | 0.5(67) | 0.5(67) | 0.5(67) |
|  | Average retention time | min | 30 | 30 | 30 | 30 | 30 | 90 | 30 |
|  | Stirring speed | rpm | 20 | 20 | 20 | 20 | 20 | 20 | 20 |
| Resin Data | Mw | — | 63000 | 61000 | 55000 | 57000 | 33000 | 60000 | 25000 |
|  | Increase in Mw | Mw increase/min | 1303 | 939 | 1061 | 818 | 342 | 408 | 152 |
|  | OH concentration | ppm | 280 | 430 | 510 | 430 | 13000 | 800 | 600 |
|  | N value | — | 1.22 | 1.22 | 1.22 | 1.22 | 1.22 | 1.31 | 1.21 |
|  | YI value | — | 1.1 | 1.2 | 1.2 | 1.1 | 1.2 | 3.0 | 1.2 |

(*1) No. of moles to 1 mole of all terminal groups of PP

Furthermore, the symbols and types of equipment shown in Table 1 are as indicated below.

Kneader type A in step (B): SIKRC Kneader, trade name, Kurimoto, Ltd. (size: D 25 mm×255 mm (L/D=10.2)

Kneader type B in step (B): SIIKRC Kneader, trade name, Kurimoto, Ltd. (size: D=50 m×661.5 mm (L/D=13.2)

Transesterification reaction vessel of step (C): Spectacle-shaped blade polymerizer (34L), Hitachi Ltd.

CHDM: 1,4-cyclohexane dimethanol
DDM: Decalin-2,6-dimethanol
BEPG: 2-butyl-2-ethylpropane-1,3-diol As can be determined from Table 1, in the case of employing the method of the present invention, a desired high molecular weight can be attained in a short retention time, and as a result thereof, a high molecular weight polycarbonate resin can be obtained that has a low N value, low YI value and favorable hue.

On the other hand, in Comparative Example 1, in which an aromatic polycarbonate prepolymer and aliphatic diol compound were mixed for a long period of time until the terminal hydroxyl group concentration increased to a degree that it exceeded 2000 ppm, followed by supplying the mixture to a linking and highly polymerizing reaction vessel and carrying out a linking and highly polymerizing reaction, a desired high molecular weight was not attained in step (C) in the case of the same short retention times in Examples 1 to 4.

In addition, in Comparative Example 2, in which an aromatic polycarbonate prepolymer and aliphatic diol compound were mixed for a long period of time until the terminal hydroxyl group concentration increased to a degree that exceeded 2000 ppm, followed by supplying the mixture to a linking and highly polymerizing reaction vessel and carrying out a linking and highly polymerizing reaction, although molecular weight was able to be increased to the same degree as Examples 1 to 4 by extending the retention time to 90 minutes in step (C), the resulting high molecular weight polycarbonate resin had a high N value, high YI value and was inferior in terms of hue.

In addition, in Comparative Example 3, in which an aliphatic diol compound was added to an aromatic polycarbonate prepolymer at a pressure of 200 torr or lower, a considerable amount of the aliphatic diol compound volatilized, addition rate (immobilization rate) decreased, and a desired high molecular weight was not attained in step (C) in the case of the same short retention times in Examples 1 to 4.

INDUSTRIAL APPLICABILITY

According to the production method of the present invention, in a continuous production method of a high molecular weight polycarbonate resin comprising a step for subjecting an aromatic polycarbonate prepolymer and an aliphatic diol compound to a linking and highly polymerizing reaction, even an aliphatic diol compound having a comparatively low boiling point can be allowed to efficiently contribute to the linking and highly polymerizing reaction, and a high molecular weight polycarbonate resin of superior quality can be economically and advantageously produced that has a low N value and favorable hue.

The invention claimed is:

1. A method for continuously producing a high molecular weight polycarbonate resin, comprising:
   a step (A) for producing an aromatic polycarbonate prepolymer by a polycondensation reaction between an aromatic dihydroxy compound and a diester carbonate,
   a step (B) for adding an aliphatic diol compound having an aliphatic group that bonds to a terminal hydroxyl group to the aromatic polycarbonate prepolymer obtained in step (A) to obtain a prepolymer mixture, and
   a step (C) for subjecting the prepolymer mixture obtained in step (B) to a linking and highly polymerizing reaction under a reduced pressure condition; wherein,
   in step (B), the aliphatic diol compound is added to the aromatic polycarbonate prepolymer obtained in step (A) at a pressure exceeding 200 torr to obtain the prepolymer mixture, and then, the prepolymer mixture is subjected to a linking and highly polymerizing reaction under a reduced pressure condition in step (C) before the terminal hydroxyl group concentration of the aromatic polycarbonate prepolymer in the prepolymer mixture reaches 2000 ppm.

2. The continuous production method according to claim 1, wherein the prepolymer mixture is subjected to the linking and highly polymerizing reaction in step (C) within 7 minutes from the start of addition of the aliphatic diol compound.

3. The continuous production method according to claim 1, wherein the aliphatic diol compound is a compound represented by the following general formula (A):

$$HO-(CR_1R_2)_n-Q-(CR_3R_4)_n-OH \quad (A)$$

wherein, Q represents a hydrocarbon group having 3 or more carbon atoms that may contain a heteroatom, $R_1$, $R_2$, $R_3$ and $R_4$ respectively and independently represent a group selected from the group consisting of a hydrogen atom, an aliphatic hydrocarbon group having 1 to 30 carbon atoms and an aromatic hydrocarbon group having 6 to 20 carbon atoms, n and m respectively and independently represent an integer of 0 to 10, provided that n and m respectively and independently represent an integer of 1 to 10 in the case Q does not contain an aliphatic hydrocarbon group that bonds to a terminal OH group, and at least one of $R_1$ and $R_2$ and at least one of $R_3$ and $R_4$ are respectively selected from the group consisting of a hydrogen atom and an aliphatic hydrocarbon group.

4. The continuous production method according to claim 1, wherein the aliphatic diol compound is a primary diol compound.

5. The continuous production method according to claim 1, wherein the boiling point of the aliphatic diol compound is 350° C. or lower.

6. The continuous production method according to claim 1, wherein the aliphatic diol compound is a compound selected from the group consisting of pentacyclopentadecane dimethanol, 1,4-cyclohexane dimethanol, 1,3-adamantane dimethanol, decalin-2,6-dimethanol, tricyclodecane dimethanol, 2-butyl-2-ethylpropane-1,3-diol, 2,2-diisobutyl-propane-1,3-diol, 2-ethyl-2-methylpropane-1,3-diol, 2,2-diethylpropane-1,3-diol and 2-methyl-2-propylpropane-1,3-diol.

7. The continuous production method according to claim 1, wherein the terminal hydroxyl group concentration of the aromatic polycarbonate prepolymer obtained in step (A) is 1500 ppm or less.

8. The continuous production method according to claim 1, wherein the N value (structural viscosity index) as represented by the following equation (I) of the high molecular weight polycarbonate resin is 1.30 or less $$N \text{ value}=(\log(Q160\text{value})-\log(Q10\text{value}))/(\log 160 - \log 10) \quad (I)$$

9. The continuous production method according to claim 1, wherein the weight average molecular weight (Mw) of the high molecular weight polycarbonate resin and the weight average molecular weight (MwPP) of the aromatic polycarbonate prepolymer obtained in step (A) are represented by the following equation (IV):

$$Mw=k'\times\text{retention time(min)}+MwPP \quad (IV)$$

wherein, k' (units: increase in Mw/min) is a numerical number of 500 or more.

10. The continuous production method according to claim 1, wherein the linking and highly polymerizing reaction under a reduced pressure condition in step (C) is carried out using a linking and highly polymerizing reaction vessel, the linking and highly polymerizing reaction vessel is a single shaft horizontal stirred reaction vessel having a single stirring shaft or a multiple shaft horizontal stirred reaction vessel having a plurality of stirring shafts, at least one of the stirring shafts has a horizontal rotating shaft and mutually discontinuous impellers attached to the horizontal rotating shaft at nearly a right angle, a ratio L/D, when the length of the horizontal rotating shaft is defined as L and the rotating diameter of the impellers is defined as D, is 1 to 15, and an extraction port for the high molecular weight polycarbonate resin formed is provided on the opposite side from a feed port for the aromatic polycarbonate prepolymer.

11. The continuous production method according to claim 1, wherein the linking and highly polymerizing reaction under a reduced pressure condition in step (C) is carried out using a linking and highly polymerizing reaction vessel, the linking and highly polymerizing reaction vessel is a single shaft horizontal kneading reaction vessel of the continuous screw type having a single stirring shaft or a multiple shaft horizontal kneading reaction vessel of the continuous screw type having a plurality of stirring shafts, a ratio L/D when the length of the stirring shaft is defined as L and the screw diameter is defined as D is 20 to 100, and an extraction port for the high molecular weight polycarbonate resin formed is provided on the opposite side from a feed port for the aromatic polycarbonate prepolymer.

12. The continuous production method according to claim 1, wherein addition and mixing of the aliphatic diol compound with the aromatic polycarbonate prepolymer in step (B) is carried out using an inline mixer.

13. The continuous production method according to claim 12, wherein the inline mixer is selected from the group consisting of a static mixer, a kneader and an extruder.

* * * * *